(12) United States Patent
Eason et al.

(10) Patent No.: US 6,375,135 B1
(45) Date of Patent: Apr. 23, 2002

(54) HIGH STRENGTH ENGINEERED COLLAPSIBLE TRIPOD

(75) Inventors: Donald H. Eason, Fort Collins; Jonathan P. Workman, Masonville; Kenneth W. House, Fort Collins; Douglas A. Kempel, Wellington; Robin R. Slaton; Tillman F. Taylor, both of Fort Collins, all of CO (US)

(73) Assignee: Ultimate Support Systems, Inc., Fort Collins, CO (US)

( * ) Notice: Subject to any disclaimer, the term of this patent is extended or adjusted under 35 U.S.C. 154(b) by 0 days.

(21) Appl. No.: 09/231,948

(22) Filed: Jan. 15, 1999

Related U.S. Application Data
(60) Provisional application No. 60/071,528, filed on Jan. 15, 1998.

(51) Int. Cl.$^7$ .............................................. F16M 11/38
(52) U.S. Cl. ..................... 248/166; 248/163.1; 248/171
(58) Field of Search ................................. 248/166, 161, 248/163.1, 411, 440, 170, 188.8, 188.9, 171; 403/161, 119

(56) References Cited

U.S. PATENT DOCUMENTS

| | | |
|---|---|---|
| 137,960 A | 4/1873 | Rearden |
| 230,851 A | 8/1880 | Anthony |
| 368,426 A | 8/1887 | Ruttmann et al. |
| 446,835 A | 2/1891 | Kennedy |
| 506,675 A | 10/1893 | Devore |
| 511,367 A | 12/1893 | Slater |
| 556,806 A | 3/1896 | Chandler |
| 574,629 A | 1/1897 | Phillips |
| 576,351 A | 2/1897 | Penfield |
| 577,910 A | 3/1897 | Bierbach |
| 592,534 A | 10/1897 | Webster et al. |
| 595,891 A | 12/1897 | Robertson |
| 619,186 A | 2/1899 | Kingsbury |

(List continued on next page.)

FOREIGN PATENT DOCUMENTS
FR 1247112 10/1960

OTHER PUBLICATIONS

1997 Park Tool Catalog, pp. 58 and 59.
Konig and Meyer 1993 catalog.
Konig and Meyer brochure for a non–memory element, non–cam musical stand.
LINDCRAFT Bycycle Display Fixtures, Wall Mounted Racks, Price List, Published May, 1995.
RAKK Integrated Bike Display System, Ultimate Support Bicycle Support, Brochure, Published Sep., 1995.
YAKIMA, Product Index, Published Sep., 1995.

*Primary Examiner*—Ramon O. Ramirez
*Assistant Examiner*—A. Joseph Wujciak
(74) *Attorney, Agent, or Firm*—Santangelo Law Offices P.C.

(57) ABSTRACT

A high strength, engineered collapsible support has separate shear bearing surfaces and pivot elements which permit efficient manufacture and higher strength. Unitary brace attachment is achieved with designs which can be molded and yet both efficiently manufactured and made acceptably strong such that heavy items such as performance or commercial speakers can be mounted stably. An extendible sleeve permits adjustment; a semiautomatic as well as manual clutch assembly permits quick securement of the top mast to the tripod; compression rings allow a secure fitting to be established between various pieces; leg upper end caps allow the legs of the tripod to be coupled to the main mast of the tripod; an end plug can serve to reduce the number of parts necessary to couple the various leg braces to the bottom of the main mast. Strength is achieved through multiple shear surfaces located at a distance from a pivot retention element and with parallel braces.

46 Claims, 16 Drawing Sheets

U.S. PATENT DOCUMENTS

| | | | |
|---|---|---|---|
| 653,519 A | 7/1900 | Masters | |
| 688,623 A | 12/1901 | Forry | |
| 730,062 A | 6/1903 | Widmer | |
| 731,651 A | 6/1903 | Allen | |
| 748,387 A | 12/1903 | Lilly | |
| 1,597,786 A * | 8/1926 | Hamel | 248/188.8 X |
| 1,673,205 A | 6/1928 | Romao | |
| 1,684,912 A | 9/1928 | Dunklau | |
| 1,863,756 A | 6/1932 | Lufkin | |
| 1,932,074 A | 10/1933 | Johnson, Jr. | 287/108 |
| 2,194,800 A * | 3/1940 | Ley | 248/166 X |
| 2,567,554 A | 9/1951 | Davey | 33/107 |
| 2,630,289 A | 3/1953 | Selig et al. | 248/169 |
| 2,727,708 A | 12/1955 | Lorenzen | |
| 2,940,709 A | 6/1960 | Neuwirth | 248/168 |
| 3,116,836 A | 1/1964 | McCauley | 211/21 |
| 3,125,341 A | 3/1964 | Carrington | 272/73 |
| 3,338,539 A | 8/1967 | Foster | 248/188.2 |
| 3,526,380 A | 9/1970 | Tong | |
| 3,530,548 A | 9/1970 | Gearin | 24/123 |
| 3,603,459 A | 9/1971 | Erb | 211/20 |
| 3,675,784 A | 7/1972 | John | 211/22 |
| 3,709,454 A | 1/1973 | Hyde | 248/351 |
| 3,741,509 A * | 6/1973 | Kelly | 248/161 |
| 3,762,569 A | 10/1973 | Spring | 211/5 |
| D229,132 S | 11/1973 | Uroshevich | D6/29 |
| 3,785,500 A | 1/1974 | Kennelly | 211/5 |
| 3,785,517 A | 1/1974 | Brajkovich | 214/450 |
| 3,804,355 A | 4/1974 | Uroshevich | 248/125 |
| 3,836,986 A * | 9/1974 | Kawazoe | 248/170 X |
| 3,881,675 A | 5/1975 | Matchett | 248/170 |
| 3,883,002 A | 5/1975 | Moore | 211/18 |
| 3,907,114 A | 9/1975 | Ewers | 211/20 |
| 3,941,406 A | 3/1976 | Eggleston | 280/400 |
| 3,950,941 A | 4/1976 | Ohm | 59/93 |
| 3,958,786 A | 5/1976 | Mann | 248/176 |
| 3,981,491 A | 9/1976 | Snyder | 269/64 |
| 4,010,922 A | 3/1977 | Heller et al. | 248/165 |
| 4,015,718 A | 4/1977 | Bernard | 70/235 |
| 4,033,459 A | 7/1977 | Zach | 211/20 |
| 4,061,302 A | 12/1977 | Boone | 248/170 |
| 4,126,228 A | 11/1978 | Bala et al. | 211/5 |
| D260,248 S | 8/1981 | Gallagher | D12/115 |
| D260,589 S | 9/1981 | O'Brien | D6/176 |
| 4,317,552 A | 3/1982 | Weidler | 248/168 |
| 4,321,874 A | 3/1982 | Cenna | 108/99 |
| 4,352,432 A | 10/1982 | Smith | 211/19 |
| 4,352,480 A | 10/1982 | Garthright | 248/443 |
| 4,371,082 A | 2/1983 | Hostert | 211/22 |
| D268,458 S | 4/1983 | Schoenig | D6/29 |
| 4,467,693 A | 8/1984 | Nasfell, Jr. | 84/329 |
| 4,629,104 A | 12/1986 | Jacquet | 224/324 |
| 4,629,150 A | 12/1986 | O'Callaghan | 248/167 |
| D289,835 S | 5/1987 | Schoenig et al. | D6/462 |
| 4,662,617 A | 5/1987 | Ditterline, Jr. et al. | 269/16 |
| 4,671,479 A | 6/1987 | Johnson et al. | 248/173 |
| 4,691,610 A | 9/1987 | Gilbert | 84/327 |
| 4,693,161 A | 9/1987 | Uhrig | 84/327 |
| 4,695,021 A | 9/1987 | Leinfelder | 248/168 |
| 4,744,536 A | 5/1988 | Bancalari | 248/125 |
| 4,763,865 A | 8/1988 | Danner | 248/164 |
| D298,524 S | 11/1988 | DeLuca | D12/115 |
| 4,785,708 A | 11/1988 | Vaughan | 84/329 |
| 4,802,594 A | 2/1989 | Graber | 211/20 |
| 4,807,837 A | 2/1989 | Gawlik et al. | 248/125 |
| 4,830,167 A | 5/1989 | Lassche | 194/247 |
| 4,842,148 A | 6/1989 | Bowman | 211/18 |
| 4,890,531 A | 1/1990 | Tischer | 84/329 |
| 4,917,341 A | 4/1990 | Pirchio | 248/164 |
| 4,923,156 A | 5/1990 | Linneusson | 248/170 |
| D311,884 S | 11/1990 | Kagayama | D12/115 |
| 4,988,064 A | 1/1991 | Hoshino | 248/17 |
| 5,029,795 A | 7/1991 | Dexter | 248/431 |
| 5,078,277 A | 1/1992 | Tschritter | 211/20 |
| D330,695 S | 11/1992 | Simmons | D12/115 |
| 5,165,635 A | 11/1992 | Hoshino | 248/169 |
| 5,169,044 A | 12/1992 | Englander | 224/324 |
| D332,882 S | 2/1993 | Graves | D6/466 |
| 5,186,569 A | 2/1993 | Wu | 403/154 |
| 5,188,479 A | 2/1993 | Nehls | 403/306 |
| 5,199,930 A | 4/1993 | Weber | 482/17 |
| D335,889 S | 5/1993 | Gibran | D16/244 |
| 5,213,296 A | 5/1993 | Lee | 244/166 |
| 5,246,120 A | 9/1993 | Walker | 211/19 |
| 5,267,657 A | 12/1993 | McGuiness et al. | 211/22 |
| 5,297,888 A | 3/1994 | Nehls | 403/306 |
| 5,301,817 A | 4/1994 | Merritt | 211/5 |
| 5,301,910 A | 4/1994 | Lang et al. | 248/166 |
| 5,320,227 A | 6/1994 | Minoura | 211/22 |
| 5,322,250 A | 6/1994 | Wilhite, Jr. | 248/166 |
| 5,340,066 A | 8/1994 | Ditch | 248/170 |
| 5,358,204 A | 10/1994 | Terada | 248/164 |
| D353,353 S | 12/1994 | Katsaros | D12/115 |
| 5,375,497 A | 12/1994 | Pirchio et al. | 84/327 |
| 5,385,246 A | 1/1995 | Grossnickle | 211/22 |
| D356,901 S | 4/1995 | Schoenig et al. | D6/400 |
| 5,417,629 A | 5/1995 | Phipps | 482/61 |
| 5,438,786 A * | 8/1995 | Hilderbrand | 248/171 X |
| 5,454,473 A | 10/1995 | Hennessey | 211/13 |
| 5,456,367 A | 10/1995 | Beukeveld | 211/22 |
| 5,467,953 A | 11/1995 | Malizia | 248/166 |
| 5,476,203 A | 12/1995 | Fletcher | 224/536 |
| 5,497,967 A | 3/1996 | Gantois | 248/166 |
| 5,498,015 A | 3/1996 | Trout et al. | 280/293 |
| 5,501,542 A | 3/1996 | Hall, Sr. | 403/306 |
| 5,505,413 A | 4/1996 | Hennessey | 248/166 |
| 5,509,629 A | 4/1996 | Sassmannhausen et al. | 248/171 |
| D370,369 S | 6/1996 | Nordstrom | D6/466 |
| D372,889 S | 8/1996 | Fox | D12/115 |
| 5,553,715 A | 9/1996 | Brotz | 211/5 |
| 5,560,498 A | 10/1996 | Porter | 211/20 |
| 5,664,756 A | 9/1997 | Liao | 248/443 |
| 5,713,547 A | 2/1998 | Yu | 248/166 |
| 5,725,106 A | 3/1998 | Wilson | 211/13.1 |
| 5,744,735 A | 4/1998 | Liao | 84/327 |
| 5,765,789 A * | 6/1998 | Ryon et al. | 248/166 X |
| 5,794,899 A * | 8/1998 | Tamllos | 248/166 |
| 5,823,491 A | 10/1998 | Lindsay et al. | 248/169 |
| 6,005,176 A | 12/1999 | Yu | 84/327 |
| 6,007,032 A | 12/1999 | Kuo | 284/185.1 |

\* cited by examiner

HIGH STRENGTH ENGINEERED COLLAPSIBLE TRIPOD

This application is a Provisional of prior application Ser. No. 60/071,528 filed Jan. 15, 1998. The contents of that application are hereby incorporated by reference.

BACKGROUND OF THE INVENTION

This invention relates to engineered supports as are often for use with telescoping poles. Specifically, the disclosed invention relates to support which is engineered for high strength and efficient manufacture and use.

The concept of a raised support such as from a tripod has been in existence for many years, if not centuries. This device has many uses. For instance, in the music industry, performance stages are repeatedly being erected and broken down. This includes not only the stages, lighting and instrument stands, but also the sound equipment as well. While the bulk of this sound equipment can be positioned at or below the stage level, it is very important for sound quality that speakers be placed at various key points, and at various heights. Sometimes these heights are well above stage level.

To provide the proper amount of support and stability to these raised speakers, utility tripods have been developed with telescoping poles, or tubes. These devices are usually collapsible such that prior to use they are opened and the item placed upon them. This collapsing mechanism has often posed problems in its potential inconsistency with the fundamental goal of a support, namely stability. The speakers used for concert events, or other stage performances, may weigh as much as 150 pounds. These heavy loads can pose a significant challenge to stable support while simultaneously providing for collapsibility.

The present invention, in its various embodiments, recognizes and addresses these problems and overcomes the limitations perceived by those skilled in the art by presenting a design which, among other aspects, allows for both stable support, a rugged design, and collapsibility. It also presents a highly manufacturable device through its combination of elements.

SUMMARY OF THE INVENTION

A tripod or high strength engineered support for the support of an object or objects at a selected height above a base surface, having a unique appearance and/or consisting of the following elements:

Three or more leg members or leg assemblies or legs (124).

Three or more leg bracing members or assemblies or elements (brace assembly or brace elements (112)).

A fixed vertical member or assembly or vertical support (101) (mainmast). An axially extendable and retractable or telescoping vertical member or assembly (topmast).

A member or fitting or assembly for pivotably joining the upper ends of the leg members (124), and for locking or attaching them to, and unlocking or detaching them from, a selectable location on the fixed vertical member or vertical support (101) (leg joiner fitting assembly or collapse element (102)).

A means of or member or fitting or assembly or attachment for pivotably attaching a first end of each leg bracing member to the lower end of the fixed vertical member (baseplug or unitary brace attachment (113)).

A means of or member or fitting or assembly for pivotably attaching a second or remaining end of each leg bracing member to a fixed location on a leg member (124).

A member or fitting or assembly for securely locking, and gradually and controllably unlocking, the telescoping vertical member at a selectable degree or ratio of axial or vertical extension relative to the fixed vertical member (telescoping clutch assembly).

The tripod may also include one or more of the following elements:

A means of or member or fitting or assembly for limiting the retraction or downward axial movement of the telescoping vertical member relative to the fixed vertical member.

A means of or member or fitting or assembly for cushioning or dampening or softening the abruptness or suddenness or hardness of the action or function of the means of limiting the retraction of the telescoping vertical member relative to the fixed vertical member (cushion element (116)).

A means of or member or fitting or assembly for limiting the extension or upward axial movement of the telescoping vertical member relative to the fixed vertical member (metal compression element).

A means of or member or fitting or assembly for preventing direct contact between the telescoping vertical member and the fixed vertical member.

A means of or member or fitting or assembly for providing a smooth or low friction sliding interface between the telescoping vertical member and the fixed vertical member.

A means of or member or fitting or assembly for selectably varying or a position selector (121) the diameter of the upper end of the telescoping vertical member (diameter adapter assembly or support adaptor (120)).

A means of or member or fitting or assembly for constraining or preventing retraction or downward axial movement of the telescoping vertical member relative to the fixed vertical member while simultaneously or concurrently allowing extension or upward axial movement of the telescoping vertical member relative to the fixed vertical member (telelock assembly).

A means of or member or fitting or assembly for modifying the characteristics of the bottom ends of the leg members (124) to prevent damage to the supporting surface and/or to create a moderate frictional engagement or force between the leg ends and the supporting surface (footcap or dual interference leg cap (118)).

DETAILED DESCRIPTION OF THE PREFERRED EMBODIMENTS

Figure 1:
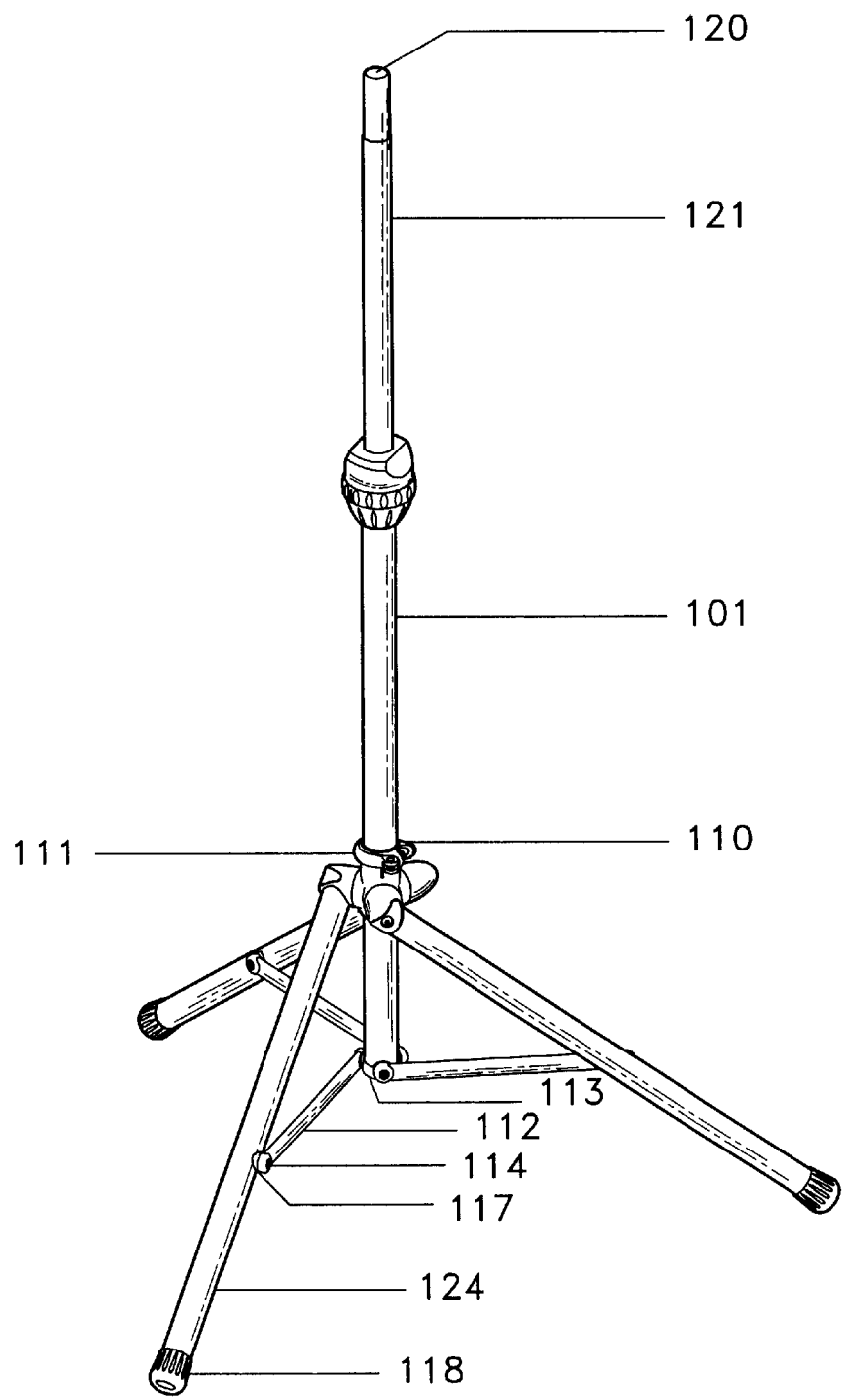
FIG. 1 is a perspective view of a tripod embodiment according to one aspect of the invention.
Figure 2:
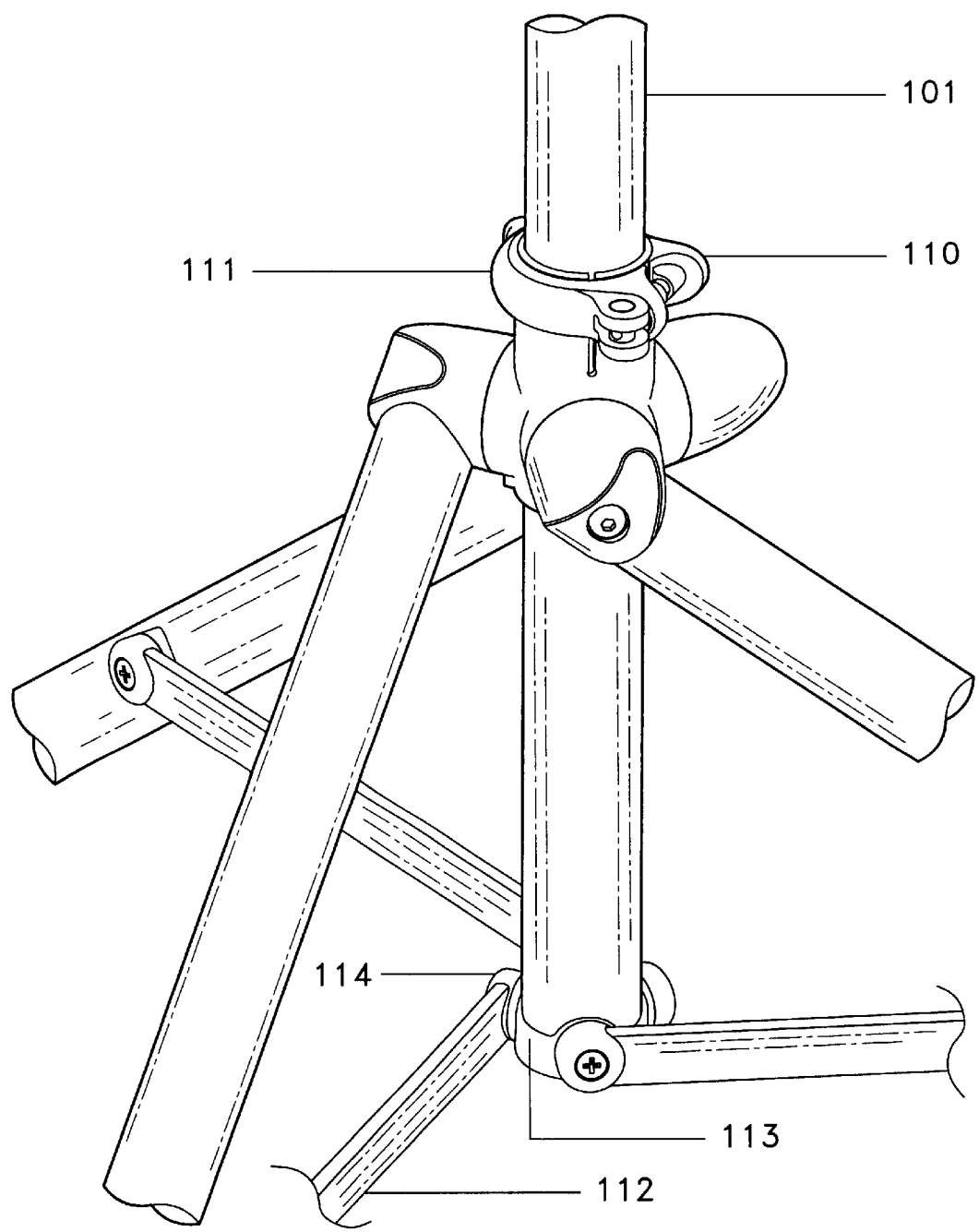
FIG. 2 is a perspective view of the upper assembly of a tripod embodiment according to one aspect of the invention.
Figure 3:
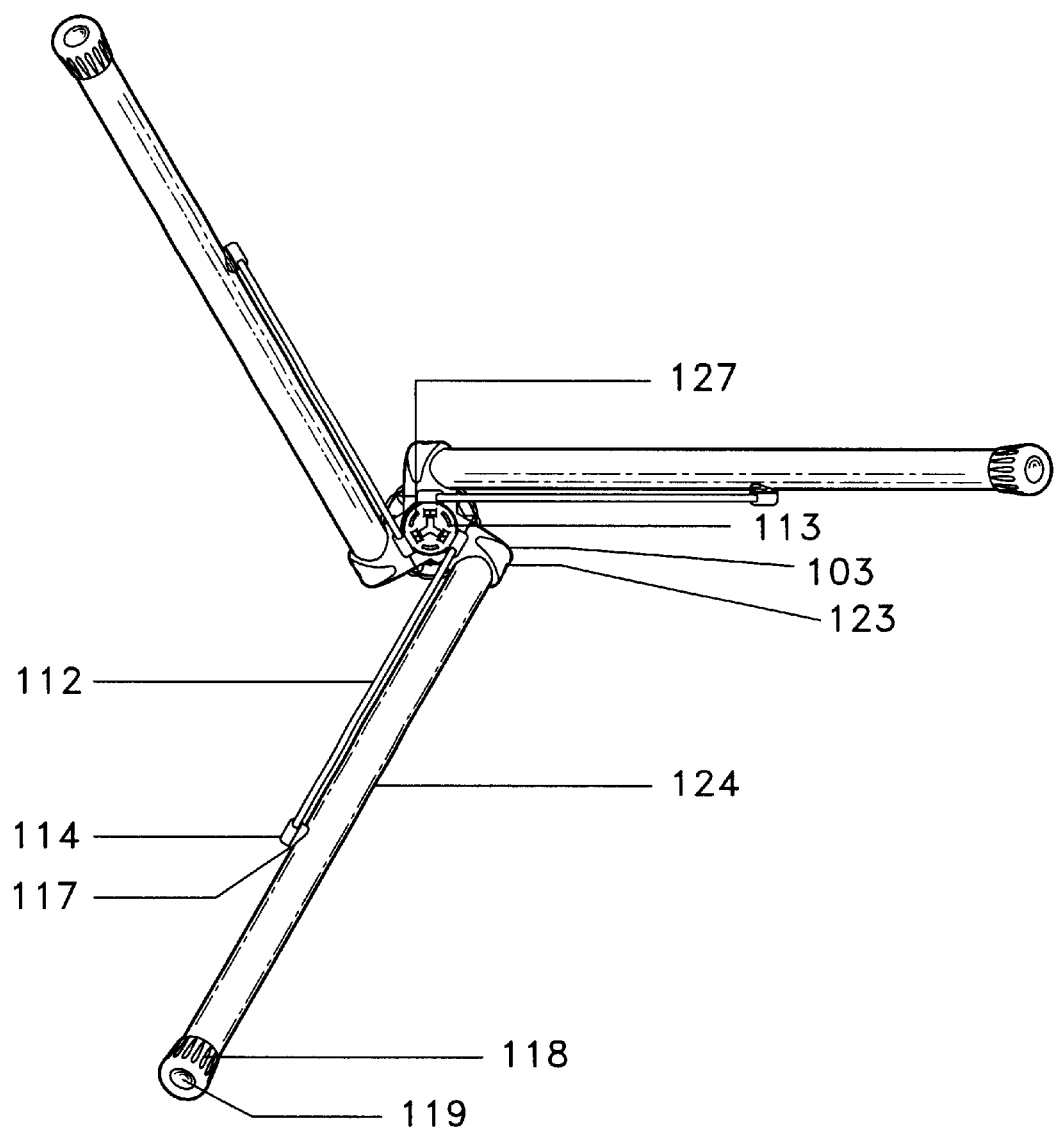
FIG. 3 is a perspective view of the bottom of a tripod embodiment according to one aspect of the invention.
Figure 4:
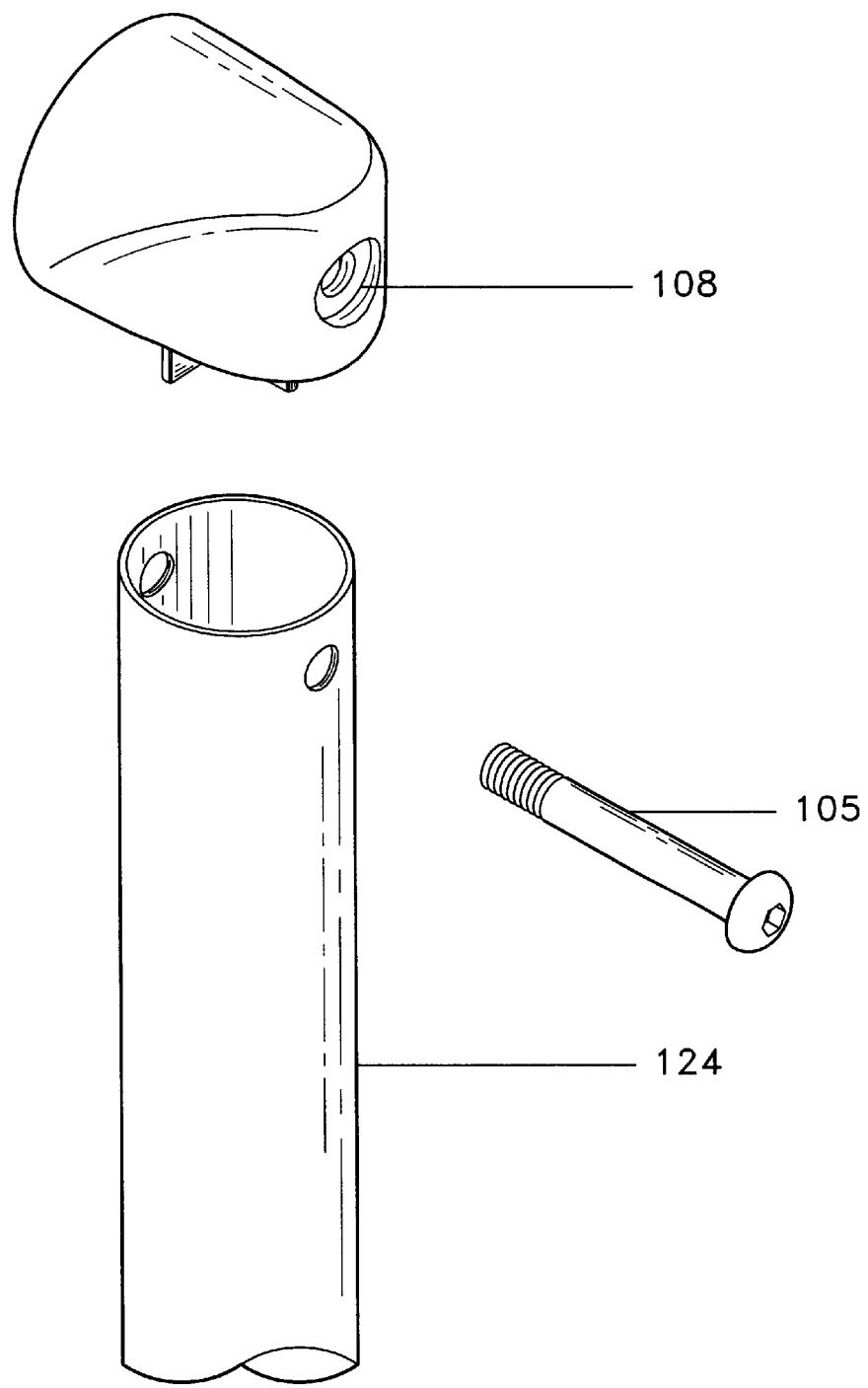
FIG. 4 is an exploded view of the pivot element according to one aspect of the invention.

As can be easily understood, the basic concepts of the present invention may be embodied in a variety of ways. It involves both support techniques as well as devices to accomplish the appropriate support. In this application, the support techniques are disclosed as part of the results shown to be achieved by the various devices described and as steps which are inherent to utilization. They are simply the natural result of utilizing the devices as intended and described. In addition, while some devices are disclosed, it would be understood that these not only accomplish certain methods but also can be varied in a number of ways. Importantly, as to all of the foregoing, all of these facets should be understood to be encompassed by this disclosure. The tripod as we have tooled it for production (a preferred embodiment) is described as follows:

The leg assembly consists of a leg tube (124), a footcap, an upper end cap, and a female threaded blind fastener. The design utilizes a unique footcap or leg cap(118) that solves several problems in the implementation of a tripod. Namely, the loss of footcaps located over metal tubes is a common occurrence. Once lost, the tripod can lose its stability and become uneven. As a result others have tried to use a footcap that has a high coefficient of friction so that the footcap will adhere to the metal tube. However, this often creates other problems. For example, the high coefficient of friction prevents the tripod from being dragged across the floor smoothly. As a result the load being supported can be disturbed or damaged. For example, a speaker could be damaged or the sound quality disturbed if in use. Furthermore, others have tried to use glue to attach the footcaps. This obviously is labor intensive and a less desired method of operation. In addition, previous footcaps have been of insufficient strength to prevent the metal leg tube (124), for example, from cutting through the footcap and damaging a supporting surface. Hence, there has been a desire for a footcap that will adhere to the leg tube (124), will have sufficient sliding or frictional properties to permit adjustment of the tripod and will have adequate strength to prevent penetration by a leg tube under load. The footcap or leg cap (118) is substantially cylindrical in shape and is open at one end and closed at the other end. The opening of the open end is of slightly smaller diameter than the outside diameter of the leg tube so that when the bottom end of the leg tube is inserted into the opening, a friction or interference created by a first interference surface (125) and a second interference surface (126) fit is the result. This provides frictional retention or attachment of the footcap to the leg tube bottom end. The closed end of the cap has an outer surface that is conically concave or indented and an inner surface or floor that is correspondingly conically convex or protruding. The edge or area of transition between the outer side surface and the conically concave outer end surface is generously rounded or radiused, providing a larger area of contact with the floor than footcaps having a less generous radius. A step or surface normal to the cylindrical axis of the footcap is provided inside the footcap. This surface provides a means of limiting insertion of the lower end of the leg tube into the footcap. Attached to the interior conically convex end surface or floor of the footcap is a plug member or protrusion which is substantially cylindrical in cross section and which extends toward the open end of the footcap. This plug member is preferably cored or ribbed to improve injection or compression moldability and to reduce material usage. The effective outer diameter of this plug member is slightly larger than the inner diameter of the leg tube. When the bottom end of leg tube is inserted into the opening at the upper or open end of the footcap and is pushed into the cap to its full insertion length, the plug member is simultaneously inserted into the open bottom end of the leg tube (124), resulting in a second interference (126) or dual interference or friction fit, thus increasing the total frictional retention or attachment of the footcap to the leg tube bottom end. When the tripod is in use, the lower end of each leg assembly, with footcap installed, contacts the floor. The lower end of the leg tube (124) transfers the weight or downward force of the supported object or payload to the footcap, which in turn transfers that weight or downward force to the floor. The combination of plug member and concave lower end or enhancement element (119) of the footcap causes the lower end of the footcap to be substantially stiffened and to participate significantly in the function of transferring the weight or downward force of the supported object or payload from the leg tube (124) to the floor. This results in a partial unloading of the interface or area of contact between the sharp lower end of the leg tube and the footcap, in turn resulting in a reduction of the tendency of the sharp lower end of the leg tube to cut through the footcap and damage the supporting surface. The footcap is constructed of an elastomeric or flexible rubberlike material, preferably of Shore A87 hardness, and most preferably of Santoprene, which provides a moderate friction coefficient, allowing some adjustment in the location of the loaded tripod by dragging it along the supporting surface, while preventing accidental or unintended dislocation of the loaded tripod on the supporting surface.

The leg tube (124) is preferably of a constant hollow circular cross section, though other cross sections are possible and allowable. The leg tube can be constructed of a stiff, strong, ductile material, preferably aluminum, and can be finished on its exposed outer surface with a durable coating, preferably an anodic coating.

Located at a fixed point on the leg tube's outer surface, between its upper and lower ends, is a fastening means or member, preferably consisting of an externally installed or "blind" female threaded fastener or nut or rivet (e.g., a rivnut), which provides an attachment point for one end of a leg bracing member. Just below the upper end of the leg tube is a hole, the axis of which is normal or perpendicular to the axis of the leg tube and parallel to the axis of the aforementioned fastening means or member that is located between the upper and lower ends of the leg tube. This hole passes through both walls of the leg tube, allowing the leg tube to receive a screw or bolt or other male fastener for the purpose of pivotably attaching the upper end of the leg tube to the leg joiner fitting.

At the upper end of the leg assembly is a leg upper end cap. The leg upper end cap is preferably constructed of a material that is fairly stiff, strong in compression, low friction, and long wearing. We have chosen a non-metallic talc reinforced polypropylene for this purpose. The leg upper end cap can have a circular cross section for much of its length and may be conically or cylindrically or ellipsoidally shaped about a first axis that is horizontal when the tripod is set up for use. At its first or inner end, the leg upper end cap terminates in a substantially flat surface that can be normal or perpendicular to the leg upper end cap's first axis or perpendicular pivot element (122). A circular rib or ridge or boss or protrusion or step or shear surface (104) (comprised of a first parallel, concentric loading surface (106) and a second parallel, concentric loading surface (107)) can extend from the surface at its outer radial edge—it does not have to be on the outer radius, as it could also be of smaller radius or even multiple ridges or multiple shear surfaces or raised areas could be used. The leg upper end cap includes a first hole or bore that can be circular in cross section, the axis of which can be perpendicular to the first axis and intersect it. The first hole or bore can be open at one end, and can extend most of the way through the leg upper end cap. The first hole or bore is slightly larger in diameter than the outside diameter of the leg tube. Centered in the first hole or bore is a plug member or protrusion which is substantially cylindrical in cross section and slightly smaller in diameter than the inside diameter of the leg tube and which extends toward the open end of the first bore or hole. The plug member or protrusion is preferably ribbed or cored to improve moldability and to reduce material usage. The end surface of the leg upper end cap that is opposite the flat end is preferably cylindrical, with its axis parallel to the first hole or bore. A second hole or bore is coaxial with the first axis of the leg upper end cap and passes entirely through the leg upper end cap. This second hole or bore is of the same inside diameter as the hole in the leg tube near its upper end. The end of the second hole or bore opposite the flat end surface of the leg upper end cap contains a shallow counterbore or cylindrical recess which can partially or entirely receive the head of a fastening bolt or screw. The depth of the first hole or bore of the leg upper end plug, and the distance from the leg tube upper end to the hole near the leg tube upper end, are related in such a way that when the leg tube upper end is inserted into the leg upper end cap's first hole or bore to said hole or bore's full depth, the leg upper end cap's second hole or bore will align with the hole near the upper end of the leg tube. This alignment allows a fastening screw or bolt or pivot element to be received by the assembly of the leg tube and leg upper end cap, causing them to act substantially as a unit or collapse element (102). The heavy section of material between the first hole or bore and the flat end surface of the leg upper end cap is preferably cored or ribbed to improve moldability and to conserve material. Thus, the leg upper end fitting acts to adapt the curved outer surface of the leg tube to a flat surface on the leg joiner fitting; stiffens and reinforces the leg tube upper end, to aid in opposing the compressive forces developed by the fastener which attaches the leg upper end to the leg joiner fitting; provides a means of lessening or provides a recess (108) for the protrusion of the head of the fastener attaching the leg assembly to the leg joiner fitting; and provides a visually pleasing, smooth transition or adaptation or blending of form or shape from the leg joiner fitting to the leg assembly or flush mounts (123).

In previous devices all of the shear loading had to be borne by the bolt which attached the leg to the main mast of the tripod. With the present invention, however, that shear force can now be borne by the use of the ribbed leg upper end cap and its cooperative mating with the leg joiner fitting (a pivot element). In such a manner the shear load is absorbed by the mating rather than concentrated on the bolt or separate axial retainers and results in unexpected smooth rotation (105). Furthermore, the leg upper end cap can transition from a radius the size of the leg to a larger radius size. In such a manner, the stiffness of the fitting attachment is increased. Furthermore, the increase in radius acts as a stronger lever arm to resist bending moments from the leg. The design of the leg upper end cap also reduces parts count and assembly time.

Each brace assembly consists of a brace member or brace element and two brace end caps or brace element end caps (114), one at each end of the brace member. The brace member is constructed of a strong, stiff, ductile material, preferably aluminum, and is finished on its outer surface with a durable coating, preferably an anodic coating. The brace member's cross section is preferably constant and is preferably shaped like a modified I-beam or with concave verticle surfaces (115) with generously rounded surfaces and corner blends—this maintains strength while using less material which would add cost and weight to the device. The brace member has two opposing narrower sides and two opposing broader sides and two opposing ends. Near each end of the brace member a hole can be positioned that can pass completely through the brace member from one broader side to the other, equidistant from the two narrower sides and the nearer end. Each end can be rounded to a cylindrical surface that can be coaxial or nearly coaxial with the hole and can be of a radius that is half or slightly more than half of the broader side's width, resulting in an essentially semicircular end form.

Each brace end cap or brace element end cap (114) can be constructed of a material that is fairly stiff, strong in compression, low friction, and long wearing or non-metalic; is preferably cylindrical in shape, and has two opposing end surfaces and a side surface. The first end surface can be flat and perpendicular to the cylindrical axis. The second end surface can be flat and parallel to the first end surface. The edge where the second end surface intersects the side surface can be generously radiused or rounded. A first hole coaxial with the cylindrical axis can pass entirely through the brace end cap from one end to the other. At the second end surface, the end of the first hole can be countersunk or conically indented or recessed to receive the head of a flat head fastening screw or bolt or rivet. A second hole or bore or cavity is located on the side surface of the brace end cap. This second hole can be substantially identical in size and shape to the end of the brace member, and can be of a depth such that when the end of a brace member is fully inserted into it, the hole in the brace member is coaxial with the first hole in the brace end cap. A brace member, with a brace end cap installed at each end, can function as a unit. The brace member contributes stiffness and strength, while the brace ends provide a finished appearance, a screw countersink, and a reversible flat first end surface for bearing against mating parts. Use of a brace member/brace member end cap combination allows the brace member to be fabricated from precoated long stock lengths. Namely, the brace members can be coated and cut in long stock lengths before being fitted with the end caps that hide the cut marks. Furthermore, the use of caps saves a second fabrication step of acting upon the cut brace members in order to bore appropriate holes in appropriate orientations. Rather, the reversible end caps can be used with molded holes that take the place of bored holes on the brace members. This not only saves a step in manufacturing by doing away with the need for an operator to bore a hole on the brace member; it also cuts down on wasted brace members when the holes are inadvertently bored in the wrong orientation. An end cap may simply be removed, reversed and placed in the proper orientation.

As noted earlier, the brace end caps can hide or obscure the uncoated end surfaces of the brace member. If the brace end caps are made of an inexpensive thermoplastic such as talc reinforced polypropylene, and the brace members are fabricated from precoated long stock, the brace assembly cost is significantly reduced compared to a single piece brace with similar function.

The saddle or saddle element (117) acts to provide an interface or transition means between the curved outer surface of the leg tube (124) and the flat first end surface of the leg brace end cap. The saddle can be cylindrical with first and second end surfaces, a cylindrical side surface, and a first cylindrical axis. The cylindrical side surface can have a diameter equal to the diameter of the side surface of the brace end cap. The first surface can be flat and can be oriented perpendicular to the first cylindrical axis of the saddle. The second end surface can be concavely cylindrical, with its axis oriented perpendicular to and intersecting the first cylindrical axis. This second cylindrical axis can have a radius that is the same as the radius of curvature of the leg tube outer surface. A hole that is concentric with the first cylindrical axis can pass completely through the saddle, from one end surface to the other.

A fastener, preferably a flat head screw or bolt or rivet, can pass through the hole in one end of the brace end assembly, then through the hole in the saddle (117), and be attached to or threaded into the fastening means or member in the leg assembly (124), creating a joint that is pivotable about one axis only, with a sliding interface between the flat end surfaces of the saddle and brace end cap.

The mainmast or vertical support (101) can preferably be made of a constant hollow circular cross section, though other cross sections are possible and allowable. The mainmast can be constructed of a stiff, strong, ductile material, preferably aluminum, and can be finished on its exposed outer surface with a durable coating, preferably an anodic coating. Very near its bottom end, the mainmast can have holes for coupling to brace members. The axes of these holes can radiate from the mainmast's cross sectional axis, and be coplanar with and preferably equidistant (120 degrees where three holes are used) from each other. The diameters of these holes can also be equal. Just below the upper end of the mainmast a hole or holes is preferably located, the axis of which is normal or perpendicular to and intersects with the axis of the mainmast. This hole preferably passes through both walls of the mainmast. The hole can serve to retain the telescoping member. However, other coupling or retention devices could be used.

A baseplug or unitary brace attachment (113) can mate with the bottom end of the mainmast. The baseplug can preferably be constructed of a material that is fairly stiff, strong in compression, low friction, and long wearing. The baseplug is substantially cylindrical in shape, the outside diameter being about ¼ inch larger than the outside diameter of the mainmast. It has upper and lower end surfaces and a side surface. A circular groove formed by a first parallel interference surface (129) and a second interference surface (130) is located on the upper surface. This groove is the size and shape of the mainmast cross section, to which it mates. The groove extends into the baseplug almost to the bottom end surface, leaving a wall of around ⅛ inch. Three identical bosses or protrusions extend radially out from the side surface of the baseplug. These bosses can be cylindrical in shape with flat outer end faces of equal diameter to the brace end cap's outside diameter. The bosses can also be coaxial with the three holes near the mainmast lower end when that end is fully inserted into the baseplug.

The bottom face of the baseplug can contain three identical radial slots or rotation holder (128) (when three braces are being attached) which are aligned with the outer bosses. These slots preferably intersect at the center of the baseplug. In the radially outward direction the slots terminate about ⅛ inch short of or inside the aforementioned circular groove. In width and depth the slots are sized so as to receive threaded hex or square nuts in such a way that the nuts are held against the outer end walls of the slots with their threaded holes coaxial with the outward facing cylindrical bosses and with the holes near the bottom end of the mainmast. The sidewalls of the slots constrain the side surfaces of the nuts against rotation, so that a wrench need not be used during insertion or removal of screws. Small ribs extend from the bottom surface of the baseplug to the floor of the slots, two ribs per slot. These ribs are placed so as to constrain the nuts against movement toward the center of the baseplug. Coaxial with the outward facing cylindrical bosses, the nuts, and the holes near the lower end of the mainmast, are holes which extend from the flat ends of the bosses inward to the radial slots. Any remaining thick sections of material in the baseplug are preferably cored or ribbed to improve molding conditions and to conserve material. Holes or vents (127) communicating between the bottom end surface and the top end surface or a cored subsurface of the top end surface may be included to aid in equalizing air pressures inside and outside the mainmast during extension or retraction of the topmast, and to provide an outlet for accumulations of rainwater or other contaminants. Similar holes can be used in other parts of the tripod as well to equalize air pressure during raising or lowering of the telescoping member and to provide drainage.

This version of the baseplug can replace a combination of several pieces that were used on prior tripods. Namely, this single piece can replace a reinforcement ring used on the inside of the old end plug so that the retaining nuts don't pull through, and individual saddle pieces (117) for each brace that were used to couple a brace to the old end plug. Plus, this end plug allows one to retain the nuts in place when they are being attached to their corresponding retaining bolts. The retention of the nuts as well as the reduction in number of parts is advantageous in the reduction in assembly time.

A cushion or cushion element (116) can be placed immediately above the baseplug to provide shock absorbing effect for a telescoping mast being lowered to its lowermost position. The cushion can be hexagonal in shape to allow escape of air from the tube past the plug and through the endplug vent (127) while still providing sufficient surface area to engage the telescoping mast when it is lowered to the lowermost position. The cushion can be made of a foam material that provides sufficient spring as well as durability for repeated use.

The inner end of each brace assembly is oriented so that the first end surface of the brace end cap is flat against the flat end surface of a cylindrical boss of the baseplug, with holes of both parts coaxially aligned. Flat head screws are then used to assemble the brace assemblies to the baseplug, creating joints that are each pivotable about one axis only, with sliding interfaces between the flat end surfaces of the baseplug outer bosses and brace end cap first end surfaces.

The leg attachment fitting or leg joiner fitting or slide element (109) is basically cylindrical in shape with upper and lower ends and a side surface, and is constructed of a high stiffness, high yield strength material, preferably a non-metallic glass reinforced polycarbonate thermoplastic. It is slidably engaged with the main or stationary mast tube by means of a hole or bore which passes through the fitting from bottom to top and has an inside diameter that is slightly larger than the outside diameter of the mainmast. A recessed cylindrical surface is located near the top of the leg attachment fitting. This recessed surface engages with a compression band or metal compression element (110) and provides a means of retaining and constraining that band against axial movement relative to the leg attachment fitting. The upper end of the fitting can have two or more slots cut into it parallel to its main axis, the slots being preferably equidistant about its circumference and preferably three in number. The slots, which cut entirely through the wall between the outer side surface and inner surface of the leg joiner fitting, extend from the top end of the leg joiner fitting downward past the recessed cylindrical surface, terminating about halfway between the top and bottom ends of the leg joiner fitting. The slots provide a means of increasing the radial flexibility of the portion near the top end of the leg joiner fitting, so that a compression band (110) can displace the portioned fitting inwardly to frictionally engage the outer surface of the mainmast, thereby constraining the leg joiner fitting against both axial and rotational movement relative to the mainmast. Three identical bosses or protrusions extend radially out from the lower part of the side surface of the leg joiner fitting. These bosses are cylindrical in shape with flat outer end faces of equal diameter to the leg upper end cap's first end surface. These protrusions are circular in cross section. Their outer surfaces have recessed steps at their outer edges or margins, which mate with the previously described circular ribs on the inner surfaces of the leg upper end caps. The protrusions have holes which are coaxial with their circular cross section and which pass from their outer surfaces to the interior space of the fitting. These holes are sized to accept knurled flanged threaded metal fasteners or fittings, which are pressed into the holes from the inside. At the inner ends of these holes are recesses which provide space for the flanges on the inner ends of the threaded fasteners. The protrusions are preferably cored or ribbed for improved molding conditions and to conserve material, and any radial ribs are recessed relative to any circular ribs to prevent chatter when the leg upper end cap is slidably rotated against the outer surface of the protrusion.

A fastener, preferably a pan or round or button head screw or bolt, passes through the hole in the upper end of each leg assembly (124), and is attached to or threaded into a threaded fastener in the leg attachment fitting, creating a joint that is pivotable about one axis only, with a sliding interface between the flat end surfaces of the leg upper end fitting and leg joiner fitting protrusion. The step on the outer edge of the leg joiner fitting protrusion mates with the rib on the leg upper end fitting's first surface, providing a second or supplementary constraint against antiaxial or shear displacement of the leg end cap relative to the leg joiner fitting. This reduces shear and bending loads on the screw, making the joint substantially stronger.

Located at the upper end of the mainmast is the telescoping clutch assembly. This assembly may preferably be either of two versions: a manual version or a semiautomatic version. The manual telescoping clutch assembly can include a manual telescoping clutch fitting and a locking means. The manual telescoping clutch fitting can basically be a hollow cylinder having open top and bottom ends and an outer side surface, with a constant inside diameter slightly larger than the outside diameter of the topmast. The outer side surface of the manual telescoping clutch fitting preferably can have several diameters at different locations. The lower approximately ½ of the outer side surface can be substantially the same diameter as the inside diameter of the mainmast. Above this first diameter can be a second and preferably larger diameter, and above the second diameter can be a preferably yet larger third diameter at the upper end of the manual telescoping clutch fitting. The first diameter portion of the manual telescoping clutch fitting can be interrupted or pierced or cut through by one or more slots or reliefs or gores which preferably begin at the bottom end of the manual telescoping clutch fitting and preferably extend upward, preferably stopping at or below the second diameter. These slots are preferably shaped or radially spaced to create one or more tabs or fingers which can be flexed or sprung or deflected radially inward but which remain substantially stiff in vertical tension. Extending radially outward from each tab is a protrusion or boss or post which is substantially equal in diameter to the hole or holes located near the top end of the mainmast. These posts are so spaced or located that when the said tabs are deflected inward and the first diameter portion is fully inserted into the top end of the mainmast, the posts can be aligned with and relax or extend outwardly into the said holes. When the tripod is fully assembled, with the topmast resident or present or contained in the manual telescoping clutch fitting, these posts are constrained by the topmast against inward deflection, with the result that the manual telescoping clutch fitting is attached to and fully constrained against movement relative to the mainmast, so that the mainmast and the manual telescoping clutch fitting act as a unit. At the transitional step between the first and second diameters is preferably located a circular or annular rib, the diameter of which is preferably equal to or slightly greater than the outside diameter of the mainmast. This rib, if present, can hide or cover or obscure the unfinished or cut upper end surface of the mainmast. The second diameter portion of the manual telescoping clutch fitting is preferably of moderate wall thickness, most preferably ⅛ inch wall thickness, to provide high vertical compressive strength and favorable molding conditions or characteristics. The third diameter portion of the manual telescoping clutch fitting preferably has a diameter substantially equal to the outside diameter of the leg attachment fitting. A recessed cylindrical surface is located between the upper and lower limits of the third diameter portion. This recessed surface engages with a compression band (110) and provides a means of retaining and constraining that band against axial movement relative to the manual telescoping clutch fitting. A slot or engagement means is provided, preferably in the third diameter portion at the upper or lower limit of the recessed surface. This slot is sized to engage a protrusion of the compression band (110), and is radially positioned substantially above the corresponding slot in the leg joiner fitting. This engagement prevents or constrains the compression band against axial rotation relative to the manual telescoping clutch fitting, and assures that the compression bands attached to the manual telescoping clutch fitting and leg joiner fitting, respectively, are radially aligned one to the other. The third diameter portion of the manual telescoping clutch fitting, including the recessed cylindrical surface, is preferably ribbed or cored to improve moldability and to conserve material. The upper part of the manual telescoping clutch fitting, including its third diameter and preferably a part of its second diameter, has slots cut into it, the slots being preferably vertical and preferably four in number. The slots provide a means of increasing the radial flexibility of the upper portion of the manual telescoping clutch fitting, so that a compression band (110) can displace the fitting inwardly to frictionally engage the outer surface of the topmast, thereby constraining the topmast against both axial and rotational movement relative to the leg joiner fitting or main mast.

This type of clutch fitting is very unique in that it does not rely on friction to attach to the main mast—as designs by others have relied on in the past. Rather, it utilizes a mechanical attachment means by use of the tabs mating with the holes in the main mast and then flexing out through the holes in the main mast—such that one needs to press in on both holes at the same time while pushing the piece out of the main mast. This is advantageous in that it enables quick and reliable assembly and retention that is not susceptible to frictional inconsistencies or creep.

The previously mentioned compression band (110) can be constructed of a high strength and very high stiffness material, preferably a castable metal such as zinc or aluminum, and can be basically cylindrical, with a top and bottom end and a side surface. A first hole or bore can pass completely through the compression band from top to bottom. This hole can be slightly larger in diameter than its mating recessed cylindrical surface on the leg joiner fitting or the manual telescoping clutch assembly. A relief slot that is preferably radial passes through the side of the compression band from its outer side surface to the surface of its inside hole or bore. In height this slot is equal to the total height of the compression band, creating two opposing surfaces that are at a distance from each other and are preferably parallel to each other and preferably vertical. Located near the slot are two swellings or protrusions or bosses, one to each side of the slot and preferably symmetric about the vertical midplane of the slot. These bosses are pierced through by a second hole, the axis of which is preferably normal to the vertical midplane of the slot. The pair of bosses have outer opposing surfaces which are substantially parallel to each other and to the vertical midplane of the slot, and are perpendicular to the axis of the second hole. A stepped recess is preferably located in each of the said outer opposing surfaces, the outer step being circular in cross section and sized to receive a washer, and the inner step being hexagonal or square in cross section and sized to receive a threaded nut. These stepped recesses are coaxial with the second hole. When the bosses are displaced toward each other, the slot narrows and the effective inside diameter of the compression ring is made smaller, thus exerting an inward radial force on the fitting to which the compression ring is attached. A tab or rib or protrusion extends downward from a location on the bottom end of the compression ring. This tab engages a slot in the leg joiner fitting or manual telescoping clutch fitting, preventing rotation of the compression ring relative to that fitting.

Use of a compression band (110) in combination with a thermoplastic material allows a high strength and flexible combination. The metal reduces the spring coefficient of the assembly which allows one to lower a load with a greater degree of control. Also, the use of the metal makes overtightening less of a hazard.

A tightening means or cam arm (111) which flushly fits adjacent to the metal compression element (110) can be used to displace the bosses of the compression ring. In one embodiment, this means consists of a nut installed in the square or hexagonal recess in one boss along with a combination of washer and t-headed or other manually turnable screw installed in the other boss and engaging the nut. In another embodiment, the tightening means consists of a lever with a cam profile at one end, a wrist pin, a bearing block, and a screw. The bearing block is cylindrical in shape with its main axis oriented horizontally, its outside diameter being substantially equal to the washer-receiving steps in the compression ring bosses, and has a first and second end and a side surface. A protrusion extending from the first surface of the bearing block is sized and shaped and oriented like the hexagonal or square recesses in the compression ring bosses. The second end of the bearing block is cylindrically concave with vertical axis, and with radius similar in size to the largest effective radius of the cam profile of the lever. A linear rib or ridge protruding from this second end is horizontally oriented. A hole coaxial with the main or horizontal axis of the bearing block passes completely through the block from end to end. The lever has a first end with a spiral or snail or increasing radius cam profile that is oriented vertically so as to engage or mate with the second or cylindrical end of the bearing block. A horizontal slot divides the first end of the lever, and is sized to provide clearance for the screw shaft. A vertical hole passes completely through the divided first end of the lever, from top to bottom, coaxial with the pivot axis of the cam profile. The lever is preferably curved and shaped so as to lay in close proximity to the compression ring when tightened. The second end of the lever is preferably enlarged and rounded or smoothed to increase operator comfort during actuation. The wrist pin is a cylinder with vertical main axis, with two ends and a side surface. The outside diameter of the wrist pin is sized so as to be a close slip or clearance fit with the vertical hole in the first end of the lever. The height of the wrist pin is preferably equal to the height of the lever. A horizontal threaded cross hole passes diametrically through the wrist pin. When assembled to the compression ring, the bearing block is inserted in the stepped recess of a compression ring boss, the screw passes through the second hole of the compression ring with its head seated in the compression ring boss opposite the bearing block, and its tip extending through the bearing block. The wrist pin is installed in its corresponding hole in the first end of the lever, and the tip of the screw is threaded into the threaded cross hole in the wrist pin to an extent or distance such that when the lever is at one end of its throw or arc of travel or displacement, the screw is unloaded, and when the lever is rotated to the other end of its throw or arc of travel or displacement, the screw is loaded in tension, causing the previously described displacement of the compression ring and resulting in the locking of the leg joiner fitting or telescoping clutch assembly.

As an alternative to the manual telescoping clutch fitting and compression ring combination a semiautomatic telescoping clutch assembly may be used. Such a semiautomatic telescoping clutch assembly may be embodied by at least the following two versions. The first version can be that embodied in the figures.

A second version can also be utilized, however. These versions can provide greater tactile and audible feedback to a user than may be provided by the manual telescoping clutch fitting. In the second version, rather than a thumbscrew used against the locking plate, a pin can be used in a cam ring. The cam ring is located below the pin and can have a mating track with a helical groove. Therefore, as the cam ring is rotated, the pin located in the helical groove is pushed upward by the rotation of the helical groove. The top portion of the pin then engages the locking plate and pushes the locking plate upward so that the top mast can be released from frictional engagement with the main mast or clutch assembly. The advantages of this type of arrangement are that rather than multiple turns by the user of the screw used in the previous version, a fraction of rotation of the cam ring is all that is required to release or secure the top mast. This allows for a quick engagement or release of the top mast and allows the user to operate the tripod more efficiently while at the same time permitting a safe operation of the tripod. This can be accomplished by providing the user with a highly selectable or adjustable means of varying the friction to allow a safe rate of descent to be achieved. A hole located in the helical groove allows rainwater to drain from the semiautomatic clutch assembly or for air pressure to be equalized.

A sticker or other marking means can be located on the top cap of the semiautomatic clutch assembly to serve as an indicator that can indicate when the clutch is either engaged (e.g., locked), slightly engaged (e.g., so that the load can be raised or lowered slowly), or totally disengaged (e.g., so that the tripod can be collapsed completely). This is a significant advantage as one can see when this version compared to the previous version where only a fine pitch screw was used requiring multiple turns and consequently less exact feedback on the degree of engagement or disengagement.

In order to facilitate securing the manual clutch assembly to the tripod when the payload, such as a speaker, is being lifted off of the tripod, a spring tab can be used to bear against the outside diameter of the top mast. This helps prevent the top mast from being unintentionally extended when the speaker is removed. The spring tab can be formed by a three-sided groove in the cylindrical portion of the semiautomatic clutch assembly which is disposed inside of the main mast (said cylindrical portion surrounding the top mast). The three-sided groove forms a tab having a protrusion which can interface with the cam ring. As the cam ring is rotated to the fully locked position, a cam ring protrusion on the inner cylindrical portion of the cam ring engages the protrusion of the spring tab thereby forcing the spring tab toward the top mast. Thus, the spring tab exerts additional clamping force on the top mast and further secures it to the main mast of the tripod.

A mechanical clicker mechanism can be utilized on top of the cam ring. A series of ridges or sawtooth track on the cam ring can engage a ball bearing secured by the upper mating piece such that as the bearing is rotated across the sawtooth track, an audible sound is generated. This provides audible as well as tactile feedback to the user that the adjustment is being accomplished.

The semiautomatic clutch assembly can be coupled to the main mast through the use of a tab and hole assembly as described earlier for the manual telescoping clutch fitting. However, a bottom cover of the semiautomatic clutch assembly can be fashioned to cover the hole/tab assembly. In this fashion, the bottom cover is pushed on over the top of the main mast and held there by a ring that is slightly smaller in diameter that the outer diameter of the main mast. Recessed grooves disposed near the bottom of the bottom cover allow the tabs from the semiautomatic clutch assembly which protrude through holes in the main mast when the semiautomatic clutch assembly is installed to protrude fully. Slots in the outer edge of the bottom cover located immediately to the side of the recessed grooves allow one to insert a screw driver through such slots and depress the tabs such that the tabs can be released from the holes of the main mast and the semiautomatic clutch assembly lifted off of the main mast. The tab and hole arrangement prevents the semiautomatic clutch assembly from spinning relative to the main mast.

A telescoping member or top mast can be coupled to the main mast by one of the clutch fittings, whether manual or automatic. This top mast is typically of an outer diameter less than the main mast so that it can slide within the mainmast. The top mast in its lowermost position can engage the cushion (116) placed on top of the base plug. In this fashion, the top mast is cushioned by the cushion when the topmast is lowered to its lowermost position. A sleeve, preferably made of plastic, can be placed over the lower end of the top mast such that the outer diameter of the sleeve is slightly smaller than the internal diameter of the main mast. In this manner, the sleeve can slide smoothly along the inside diameter of the main mast. The sleeve also serves as a stop when the top mast is raised to its highest permitted position. This can be accomplished by the upper edge of the sleeve contacting the lowermost portion of the manual or semiautomatic clutch fitting which has been inserted into the main mast and secured through the previously described tab and hole arrangement. The upper edge of the sleeve abuts against the lower edge of the clutch assembly and thereby prevents the top mast from being raised any further. It also gives feedback to the operator that the top mast can't be raised safely anymore—or risk the top mast coming out of the top of the main mast. The sleeve also provides for smooth telescoping function of the top mast. A hole in the bottom of the sleeve placed over the top mast allows for the escape of air during raising and lowering of the top mast.

At the top of the telescoping member, or top mast, a diameter adapter can be used to provide support for a variety of load configurations. In the music industry, where tripods are commonly used to support speakers, speaker mounts are commonly provided in either one and one-half inch or one and three-eighth inch sizes. Therefore, it is important that a tripod be capable of handling either type of mount. In one embodiment of the present invention, this can be accomplished by a top mast having an uppermost portion with an outside diameter that accepts a one and one-half inch mount. Within this cylindrical portion of the top mast, an extendable sleeve can be disposed. The extendable sleeve can be retained within the top mast by a spring button clip and a first set of holes in the top mast. When a one and three-eighth size mount is required, however, the spring button can be compressed and the sleeve raised above the top of the top mast. A second set of holes in the top mast located above the first set of holes that retained the sleeve in its concealed position can then be used to secure the sleeve in an exposed position. The exposed sleeve is sized in diameter to serve as a one and three-eighth inch mount support. It should be understood that while one and one-half and one and three-eighths are common sizes, other sizes could be utilized as well. This embodiment of the invention is very useful because it allows one to retain the sleeve as part of the tripod when the sleeve is not in use. This prevents the sleeve from getting lost when it is not in use.

Also shown is the possibility of including a clutch mechanism which may be used in a variety of applications. In the music industry, performance stages are repeatedly being erected and broken down. This includes not only the stages, lighting and instrument stands, but also the sound equipment as well. While the bulk of this sound equipment can be positioned at or below the stage level, it is very important for sound quality that speakers be placed at various key points, and at various heights. Sometimes these heights are well above stage level.

To provide the proper amount of support and stability to these raised speakers, utility tripods have been developed with telescoping poles, or tubes. After the speaker is secured onto the top platform of the tripod it is raised to the desired height and locked into position. The locking mechanism is usually something like a pin, a locking collar, a cam mechanism, or a variation of a cramp mechanism. It is the latter of these mechanisms to which this aspect of the present invention is concerned with. As shown in U.S. Pat. No. 366014 to Maschmeyer, and U.S. Pat. No. 388195 to Hammond et al. cramp mechanisms in general have existed for quite a while.

The speakers used for concert events, or other stage performances, may weigh as much as 150 pounds. These heavy loads make it no small task for the person or persons charged to raise or lower them to the desired position. The hoisting process can be particularly dangerous as one considers that these poles typically have smooth outer surfaces and a firm grip is sometimes lost. The cramp brake is designed such that under a load the downward motion of the inner telescoping tube causes the brake to lock the descent of the pole. This is an important safety feature when the load is to be raised.

As mentioned previously, however, the poles must also at some time be lowered in order to compact the equipment for storage or transport. This can be done in prior art devices by disengaging the cramp mechanism and lowering the speaker. Because of the way the cramp is designed to work the person lowering the speaker must either permanently disengage the cramp during lowering, as with the Hammond et al. design, or with one hand hold the cramp in a disengaged position while lowering with the other hand, as shown in U.S. Pat. No. 3480247 to Waner. Either process may work well with very light loads, as is the case with both the Hammond and Waner inventions, but under heavy loads the process is much more difficult and the operator can be put at great risk. For the music industry application, add to this the fact that these speakers are delicate and expensive electronic equipment, and to have one come crashing down from a 10 foot perch would be disastrous. This aspect of the present invention has solved this problem to the degree that the operator may, with one hand, begin the slow descent of the heavy load and walk away returning to the speaker only after it is safely descended.

One of the intrinsic problems with devices such as those disclosed in the patents to Waner, Hammond et al., and Maschmeyer, and in U.S. Pat. No. 2442779 to Oriold is that they operate on an "all or nothing" principle. That is, the cramp mechanism is either fully engaged, providing maximum friction, or completely disengaged, providing no friction. This produces an acceptable safety feature in the ascending mode of operation, but is cumbersome and dangerous to operate by one person in a descending or compression mode. Instead of risking injury to the operator or speaker destruction, such devices when used with heavy loads would likely require two or even three persons to successfully lower the telescoping poles. This presents additional problems. By requiring so many persons to partake in the operation it becomes very labor and time intensive, and costly.

This aspect of the present invention, in its various embodiments, recognizes and addresses these problems and overcomes the limitations perceived by those skilled in the art by presenting a design which, among other aspects, allows for slow continuous compression of a telescoping pole. This element alone may allow a single operator to descend each telescoping pole in less time than a crew of three. Those skilled in the art of telescoping support poles and clutch mechanism design have long been aware of the problems of operator safety without controlled descent. Yet no commercially acceptable solution has been available in spite of the fact that the necessary arts and elements for implementing the disclosed invention have existed for sometime. The patents cited show that cramp mechanisms, as they are commonly called, have existed for over 100 years. Improvements have come in the way of greater locking and load ability, and widespread adaptation to uses in various fields. However, a clutch mechanism which integrates the elements of safety, variable compression rate regulation, and single operator control into a utility tripod telescoping pole has not existed until the present invention. Instead of understanding the true problem, manufacturers and users have coped with the inherent limitation to some of these devices and accepted such limitations as necessary for an inexpensive device. There appeared to be a failure to fully understand the problems and impacts of being able to safely descend a heavy load, such as a sound system speaker, using a clutch mechanism on a telescoping pole.

This aspect of the present invention discloses a safety clutch mechanism to operate in conjunction with a telescoping pole, such as used in supporting sound system speakers at a live stage performance. The device provides a reliable and effective means for safely lowering even a heavy load attached to the top of a telescoping pole. Rather than supplying a system which affords only an incremental increase in performance and design over the prior art, this aspect of the present invention utilizes techniques which were not previously considered to achieve leaps in performance compared to the prior art. This aspect of the invention serves to optimize safety for the operator by requiring less interaction and handling of the heavy loads during descent, to optimize the labor costs required by allowing less operators to lower even the heaviest of suitable loads, and to optimize equipment life by providing reversible features on highly stressed components.

In general terms, this aspect of the invention involves various embodiments of a safety clutch mechanism. Many of the elements of this device achieve several different objects which, when combined, act to achieve the mentioned leaps in performance. In the preferred embodiment, this aspect of the invention discloses an insert made of a polyamide for producing numerous degrees of frictional engagement with the inner telescoping pole to allow controlled load descent by a single person. The device may also feature a damping mechanism which permits the telescoping pole to be hand carried horizontally without accidental extension, and also prevents the characteristic "chatter" which may occur as the cramp bounces during compression. Still other features of the present device include an incremental adjustment mechanism which allows for the realization of the numerous degrees of frictional engagement of the frictional insert.

Importantly, this aspect of the invention breaks from several time-honored traditions in clutch mechanisms. While drawing from some of the important conditions demanded of these devices for providing an effective locking mechanism, this aspect of the invention expands upon these conditions in an effort to provide a safe and reliable device during compression. By recognizing and utilizing the advantages of a replaceable insert having a radiused inner surface, and designed with synthetic material for appropriate friction this aspect of the present invention achieves its goals.

Accordingly, this aspect of the present invention provides a high load safety clutch mechanism which allows slow continuous compression of a telescoping pole. The stated safety clutch acts to frictionally engage the inner telescoping pole to restrict compression while allowing expansion to occur if so desired. The safety clutch includes a replaceable snap-fit frictional insert which is capable of providing numerous degrees of frictional engagement with the inner telescoping pole. In addition the insert is reversible within an axially symmetric locking plate, in order to increase the amount of use possible from the insert. As a means for enhancing the range of frictional engagement possible, as well as the wear resistance and loadcarrying characteristics, the inner surface of the insert is radiused. To control the rate of compression of the telescoping pole the angle of inclination—which directly relates to the amount of frictional engagement—is incrementally adjusted until the desired rate is achieved.

One object of this aspect of the present invention is to provide a design which provides increased operator safety in the compression mode. It is therefore an object for this aspect of the present invention to allow the operator to set a desired compression rate of the telescoping poles. It is also an object to avoid disengaging the locking mechanism completely during compression. This provides single hand operation to activate the compression mode. It is also an object that the operator be permitted to activate the compression mode of this aspect of the invention and leave this aspect of the invention to compress automatically with no further interaction by the operator.

It is a further object of this aspect of the present invention to provide a design which allows for a single operator to lower an otherwise unmanageable load. It is thus an object that the operator never need to manually support the load during the compression mode. It is also an object that the present design allow the operator to manually assist the descent of the load without increasing the automatic unattended rate of compression.

Another object of this aspect of the present invention is that it be designed to permit horizontal or even inverted locking with no external applied load. It is an object that the device maintain a locked condition while compressed without inadvertently expanding during transport. It is also an object that this aspect of the present invention perform in a locking fashion during expansion mode.

A further object of this aspect of the present invention is that it be designed in a manner to allow maximum cost effectiveness; without compromising safety. Such cost effectiveness can be achieved through use of molded and snap-fit components. It is also an object that the present device be designed to permit quick and easy assembly. This will help to minimize cost of manufacture as well. It is still another object of this aspect of the invention to minimize possible erroneous assembly. By designing components which cannot be put in backwards or upside down assembly is made much simpler.

Figure 14:
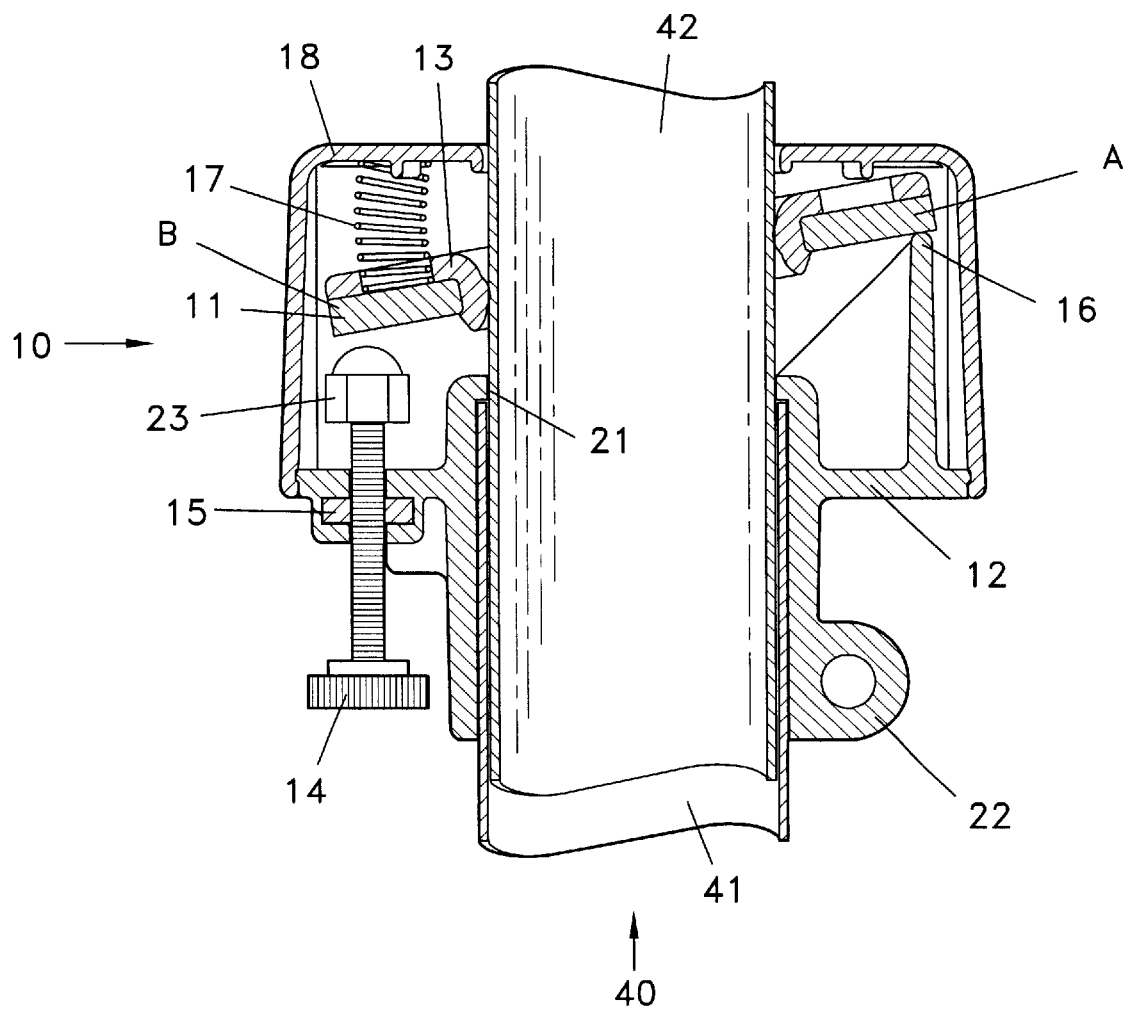
FIG. 14 is a cross section of one embodiment of the disclosed invention in a locked position.

FIG. 14 shows a cross section of device (10) attached to outer tube (41) of telescoping pole (40), and engaging inner tube (42) to lock the extended position. The basic elements of the preferred embodiment include locking plate (11), base (12), and frictional insert (13). It should be understood that while the following discussion refers to the telescoping pole in terms of ascent and descent, or raising and lowering—both of which would indicate a vertical telescoping arrangement—the terms extension and compression, or the like—which would include both a vertical and horizontal telescoping arrangement—should be considered synonymous. This aspect of the present invention is designed to work in either orientation.

Referring now to FIG. 14, it can be seen that base (12) is provided with lip (21) as a means for retaining device (10) on telescoping pole (40). Base (12) may be slipped over inner tube (42) and slid toward outer tube (41) until lip (21) abuts with the end of outer tube (41). It can be seen in FIG. 14 that a portion of base (12) surrounds the end of outer tube (41). As a further means for retaining device (10) on telescoping pole (40), clamp (22) is provided as an integral element. With the use of a nut and bolt assembly, clamp (22) may be tightened to engage outer tube (41) to prevent slippage of device (10). In the present embodiment these two elements are designed to work together to retain device (10) on telescoping pole (40). Either clamp (22) or lip (21) could be the sole means, however, in other embodiments. While clamp (22) is shown to be an integral member of device (10) it is certainly intended that the means for retaining may encompass any other device, separate or integral to device (10), suitable for the purpose of retaining device (10) onto pole (40). The need for the means for retaining is necessitated by the fact that device (10) need not be an integral component of telescoping pole (40), as with most of the prior art devices. This is an important element because it allows the replacement of either pole (40) or device (10) if they should become damaged. More importantly, the detachability of device (10) allows damaged components to be repaired or replaced with little effort or expense. This will be discussed in more detail.

Continuing with FIG. 14, this embodiment shows thumbscrew (14) providing the adjustable means for varying frictional engagement and threaded through base (12). The distal end of thumbscrew (14) is provided with cap nut (23). Thumbscrew (14) may be held in position by machine nut (15). The use of thumbscrew (14) will be more apparent in the discussion of operation. On the opposite side of base (12) is located pivot member (16). Pivot member (16) serves to maintain one end of locking plate (11) elevated at a functional height. This functional height is very important—and easily determined—to the operation of device (10). If the height is set too low a proper locking inclination would not be provided.

Figure 15:
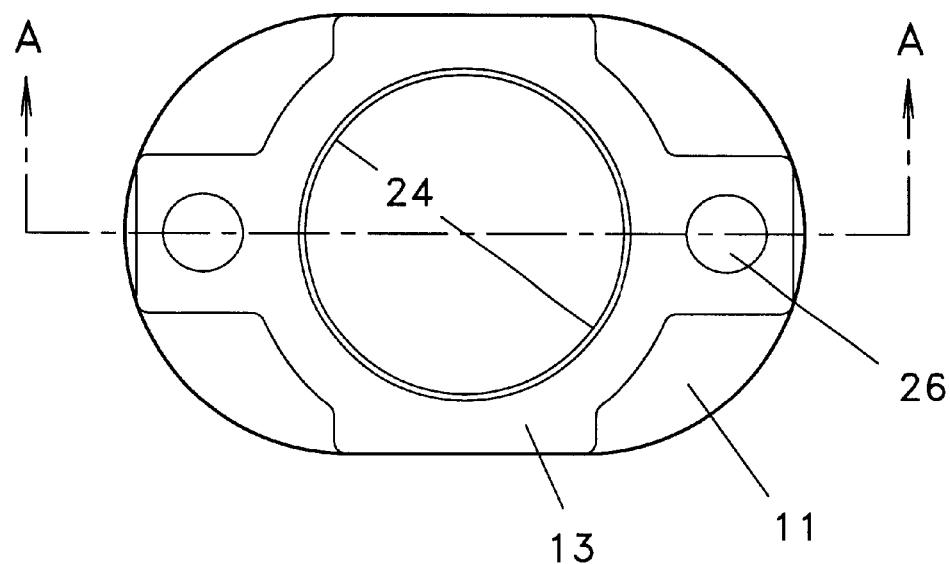
FIG. 15 is a top view of the locking plate and frictional insert.
Figure 16:
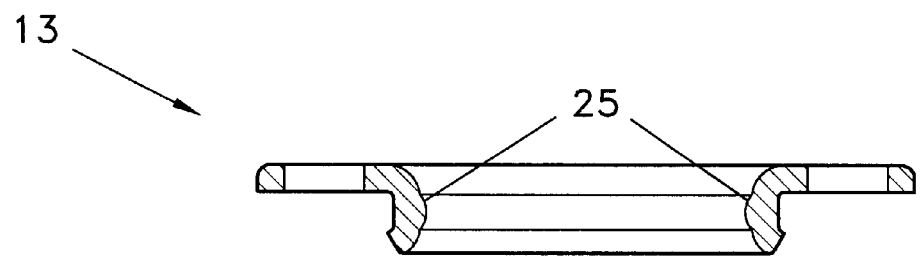
FIG. 16 is a cross section of the frictional insert showing the preferred radiused inner edge.

Locking plate (11) is superiorly situated to base (12) and surrounds inner tube (42), functioning as a means for maintaining tube (42) in an extended position. As just discussed, one side or end of locking plate (11) is held aloft by pivot member (16) while the opposite side or end is yieldingly biased downward by spring (17), in this embodiment. Naturally other means for this bias are possible, such as weight applied to low end (B) of locking plate (11) or the like. Opposing spring (17) in the bias of locking plate (11) is thumbscrew (14). This side of locking plate (11) is biased downward until cap nut (23) of thumbscrew (14) is engaged, or until a locking position is attained. Such a position is achieved when insert (13) becomes frictionally bound onto inner tube (42) and prevents the compression of inner tube (42) into outer tube (41). As shown in FIGS. 15 and 16, the shape of locking plate (11) in this embodiment is somewhat oblong. This is not a necessitated shape, and certainly other shapes, such as circular, may be utilized with equal suitability.

Figure 5:
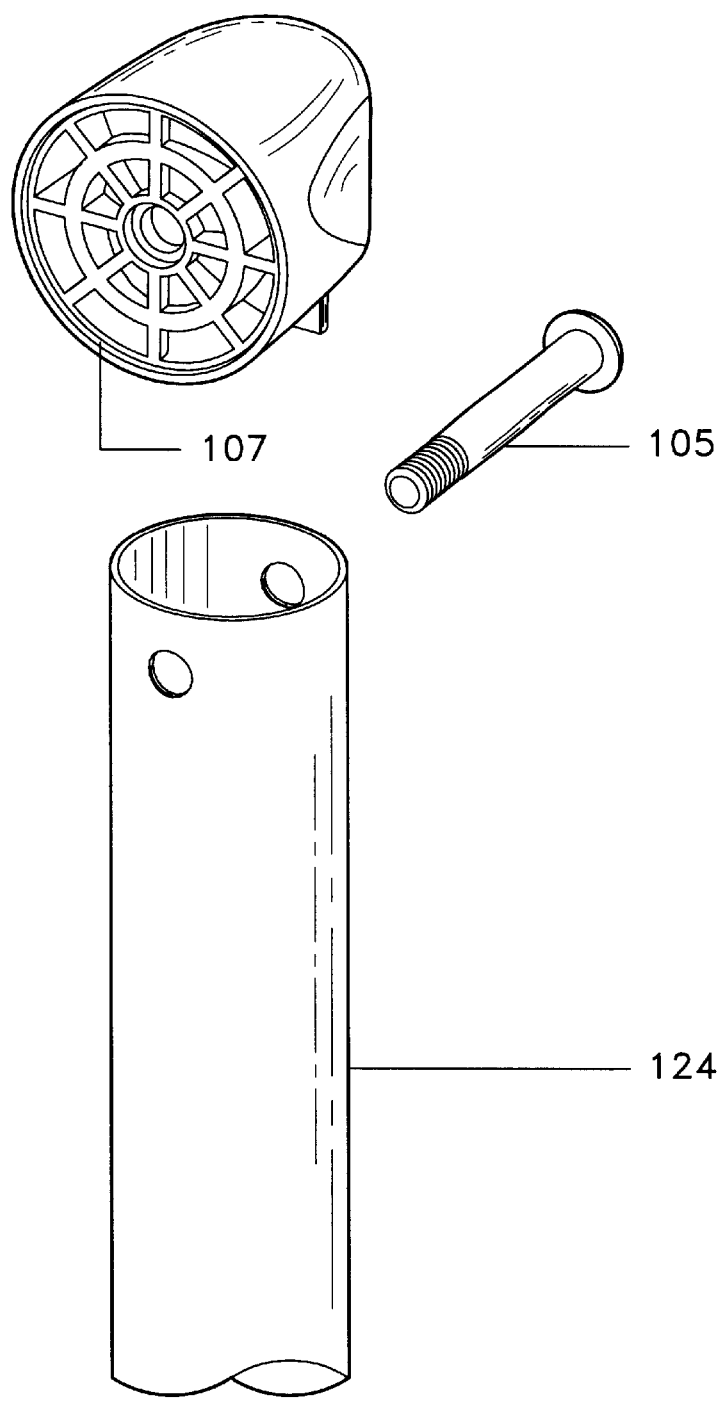
FIG. 5 is another exploded view of the pivot element according to one aspect of the invention.
Figure 6:
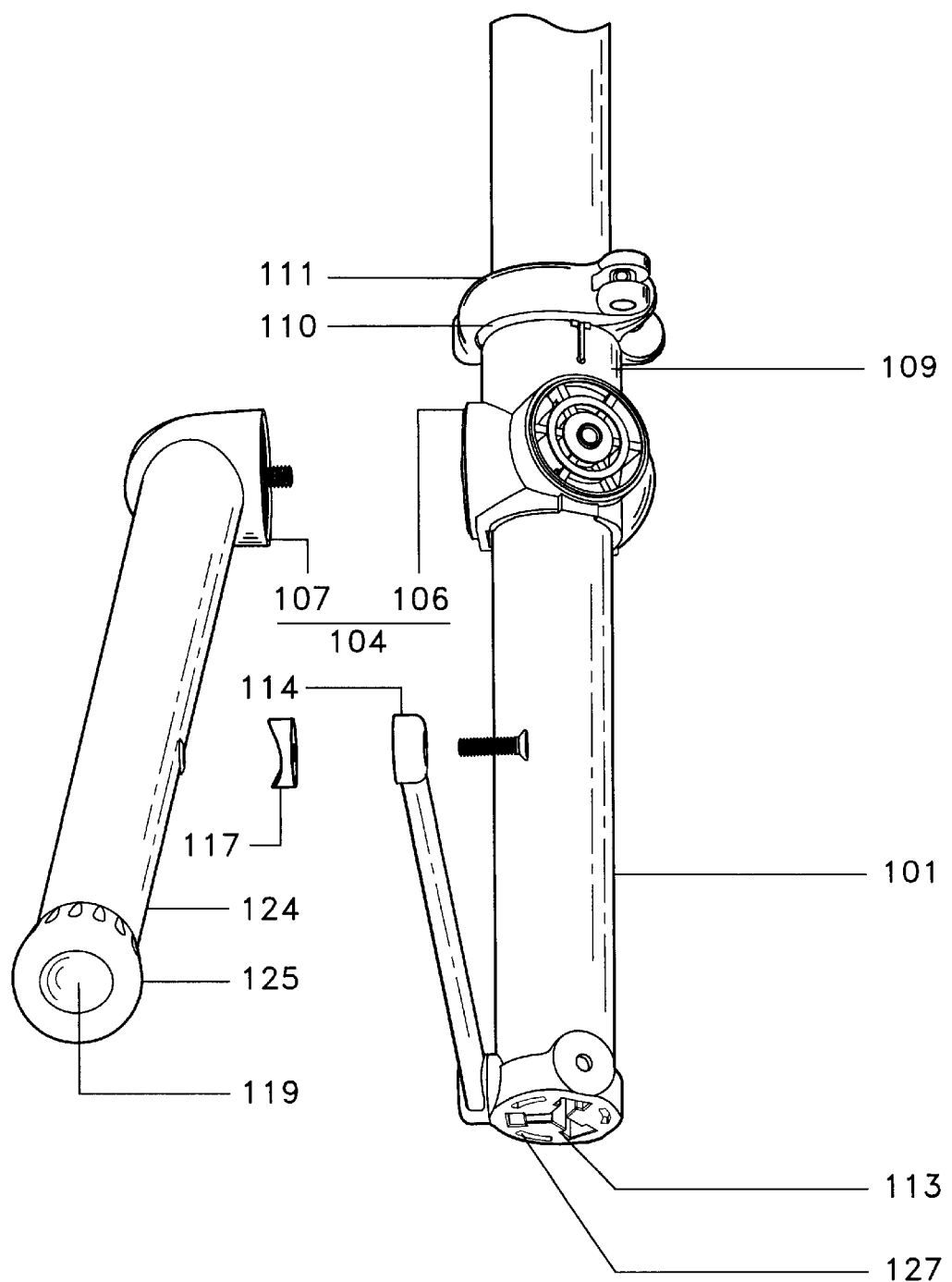
FIG. 6 is an exploded view of the pivot element and brace element according to one aspect of the invention.
Figure 7:
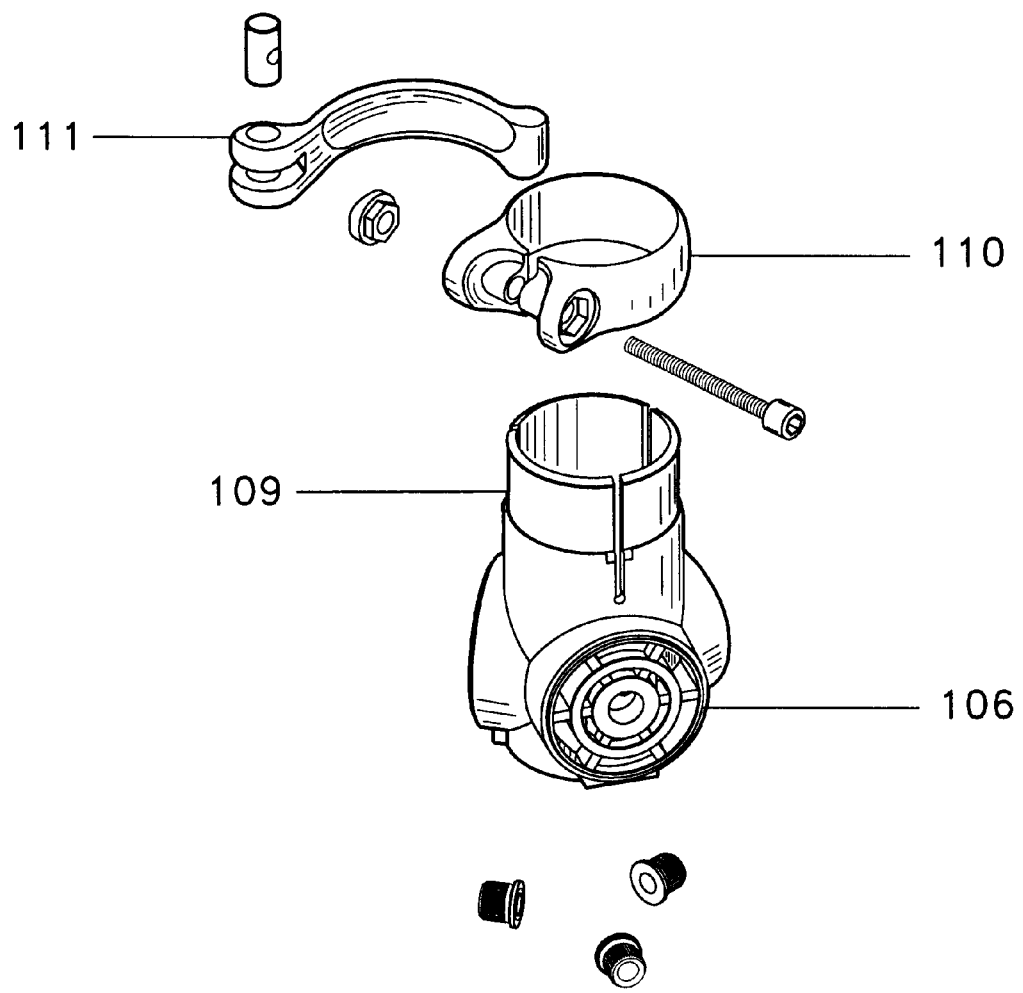
FIG. 7 is an exploded view of the slide (109) and compression assemblies (110) according to one aspect of the invention.
Figure 8:
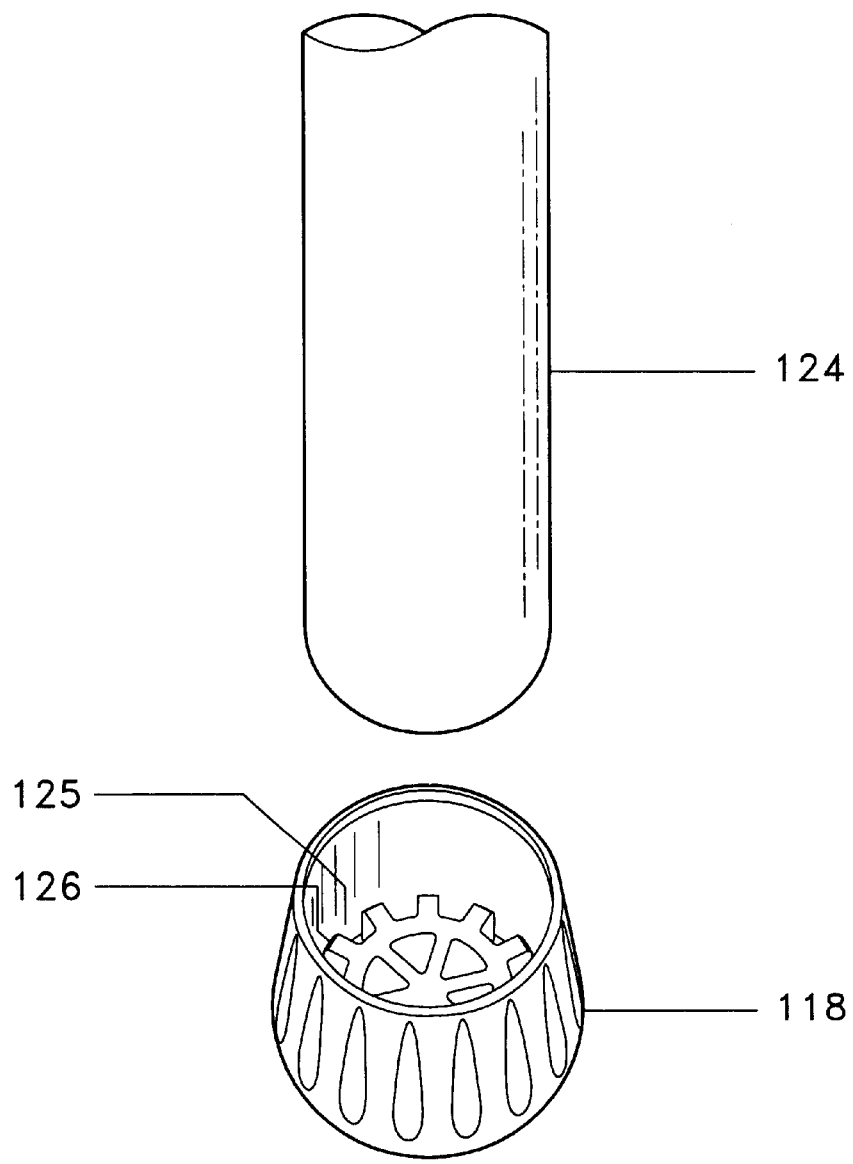
FIG. 8 is an exploded view of the end cap element according to one aspect of the invention.
Figure 9:
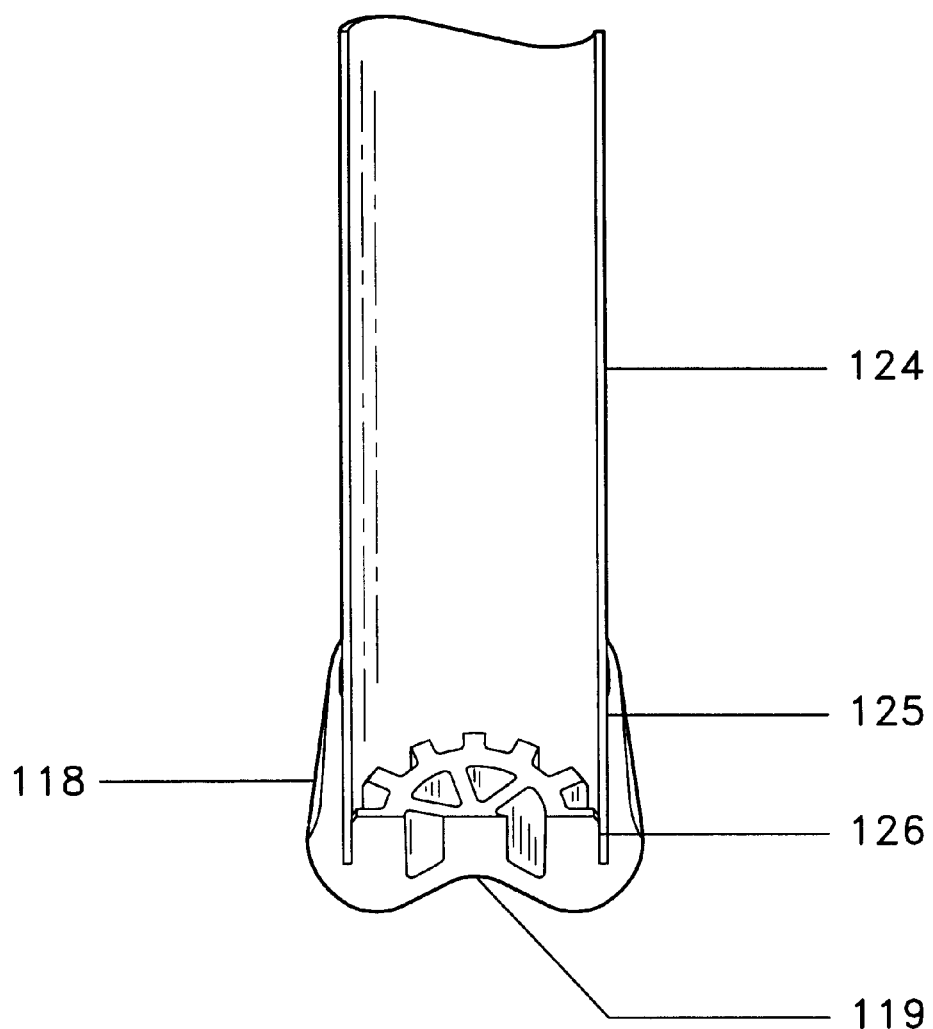
FIG. 9 is a cross sectional view of the end cap according to one aspect of the invention.
Figure 10:
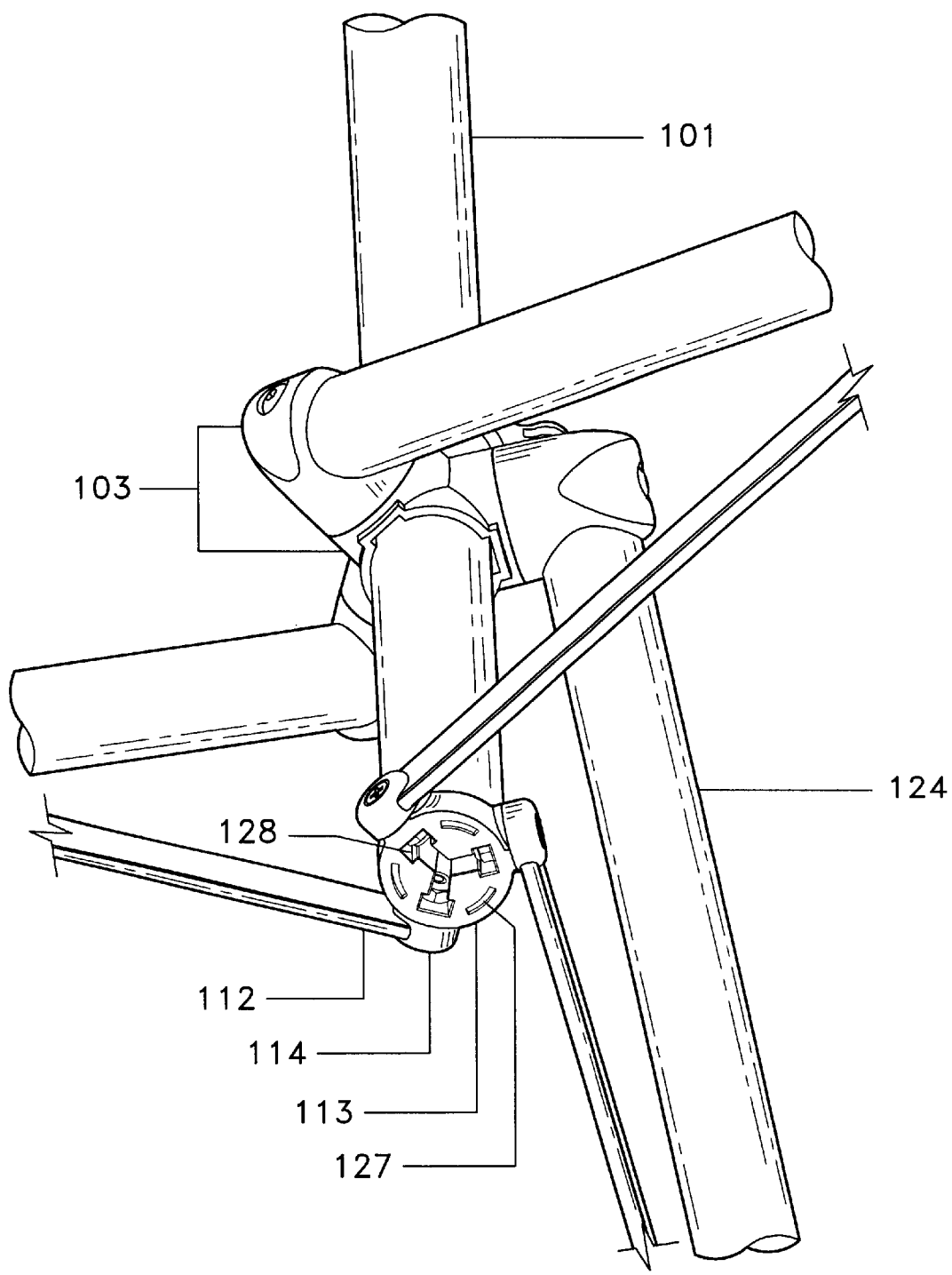
FIG. 10 is a perspective view of the bottom of a tripod embodiment according to one aspect of the invention.
Figure 11:
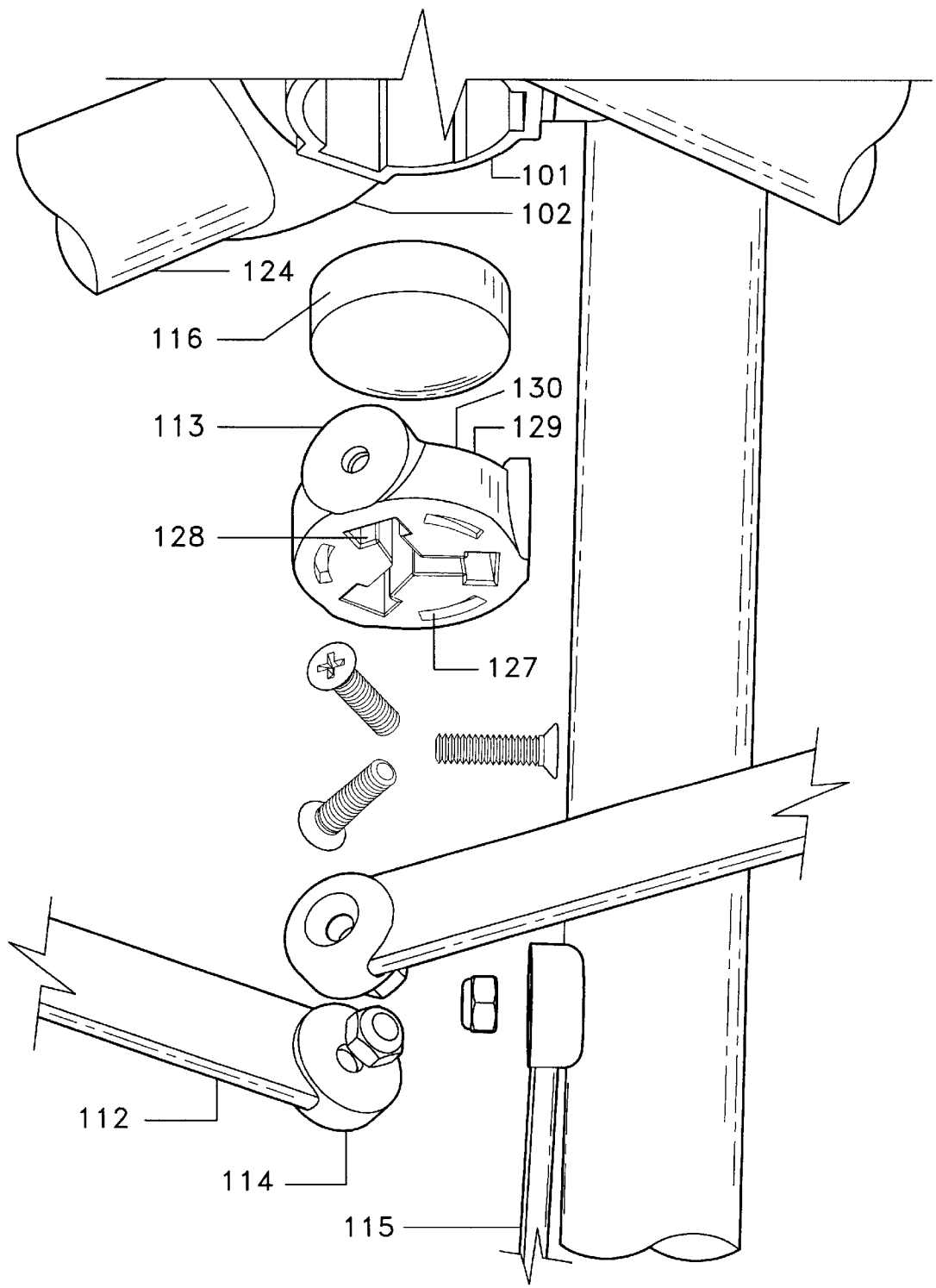
FIG. 11 is an exploded view of the unitary brace attachment element and brace elements according to one aspect of the invention.
Figure 12:
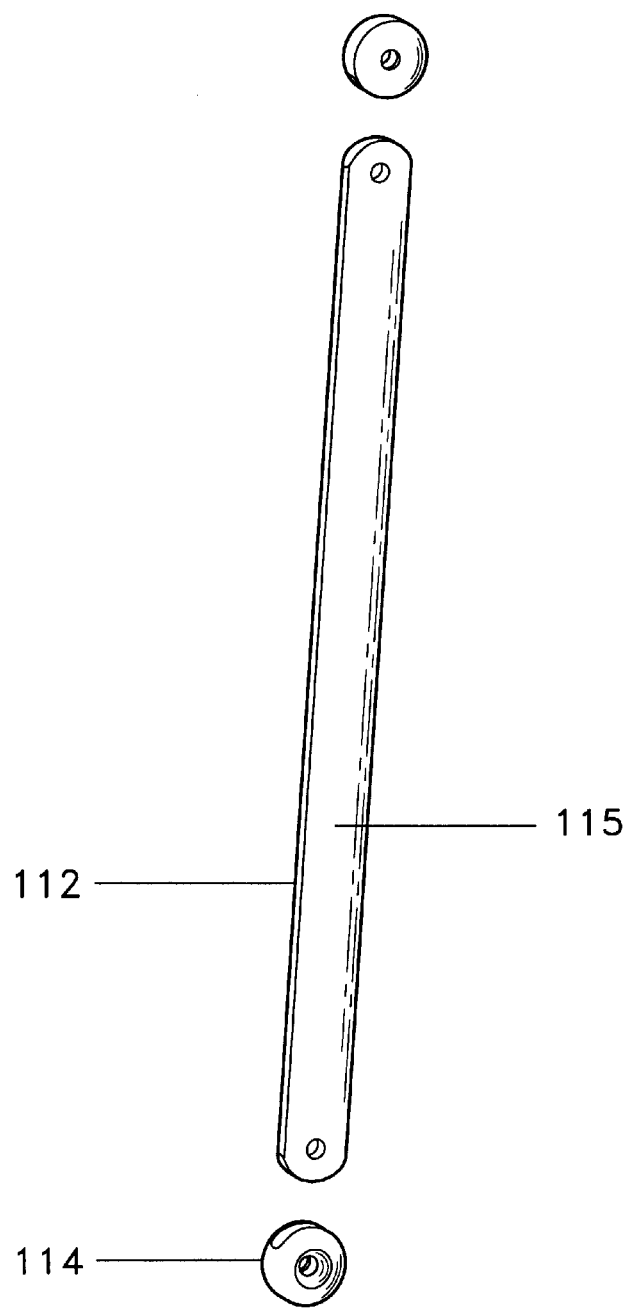
FIG. 12 is an exploded view of a brace element according to one aspect of the invention.
Figure 13:
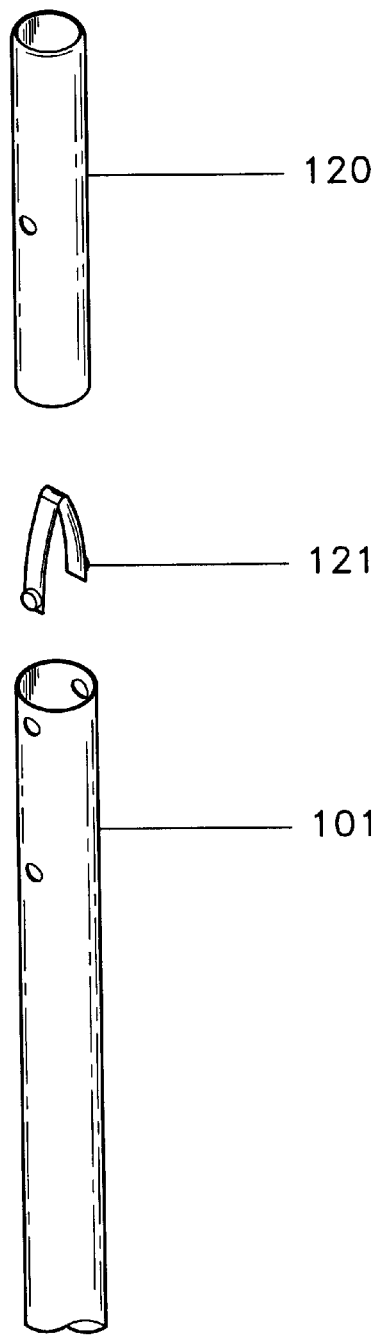
FIG. 13 is an exploded view of the adapter element according to one aspect of the invention.

Referring now to FIG. 15 it can be seen that within locking plate (11) is affixed the aforementioned frictional insert (13). Inherent to telescoping tubes is the ability or means for permitting compression of a small diameter tube into a larger diameter tube. In this aspect of the present invention, insert (13) acts to create a slow, continuous movement or compression of inner tube (42) within outer tube (41). To provide such controlled movement insert (13)

is designed with radius (25). Through trial-and-error it is believed that a radius no more than 0.125 inches works best for this feature. This size requirement is not one of mere choice, but rather serves an important functional purpose. That is, larger radii tend to wedge onto inner tube (42) and release suddenly, creating the same effect as the prior art devices as illustrated in FIG. 5. In addition, insert (13), in this embodiment, is snap-fitted within plate (11) to allow easy assembly, or even rotation as one inner edge may become worn. Insert (13) could be designed, however, as part of locking plate (11), such that they are one-piece. Ultimately, when both inner edges of insert (13) are worn beyond sufficient functional requirements insert (13) may be replaced. The design of insert (13), is such that it will wear on the top surface of high end (A), and the bottom surface of low end (B) during use. By reversing the orientation of locking plate (11) low end (B) becomes high end (A), and vice versa. The symmetry of insert (13), as shown in FIG. 15, simplifies assembly of device (10). That is, the assembler does not have to spend time figuring out the front and back of each piece as it practically cannot be improperly oriented within locking plate (11).

An advantage to the use of insert (13) with locking plate (11) is related to the materials of which they are made. Prior art devices have not apparently given much thought to the use of polyamide materials for cramp mechanisms. This may be because of its inferior strength when compared to most metals, even though it may provide ideal frictional engagement. Additionally, polyamide materials have favorable wear characteristics. This aspect of the present invention has combined the advantages of each material to provide a strong locking mechanism with variable, and controllable, degrees of frictional engagement, and excellent wear characteristics.

Figure 17:
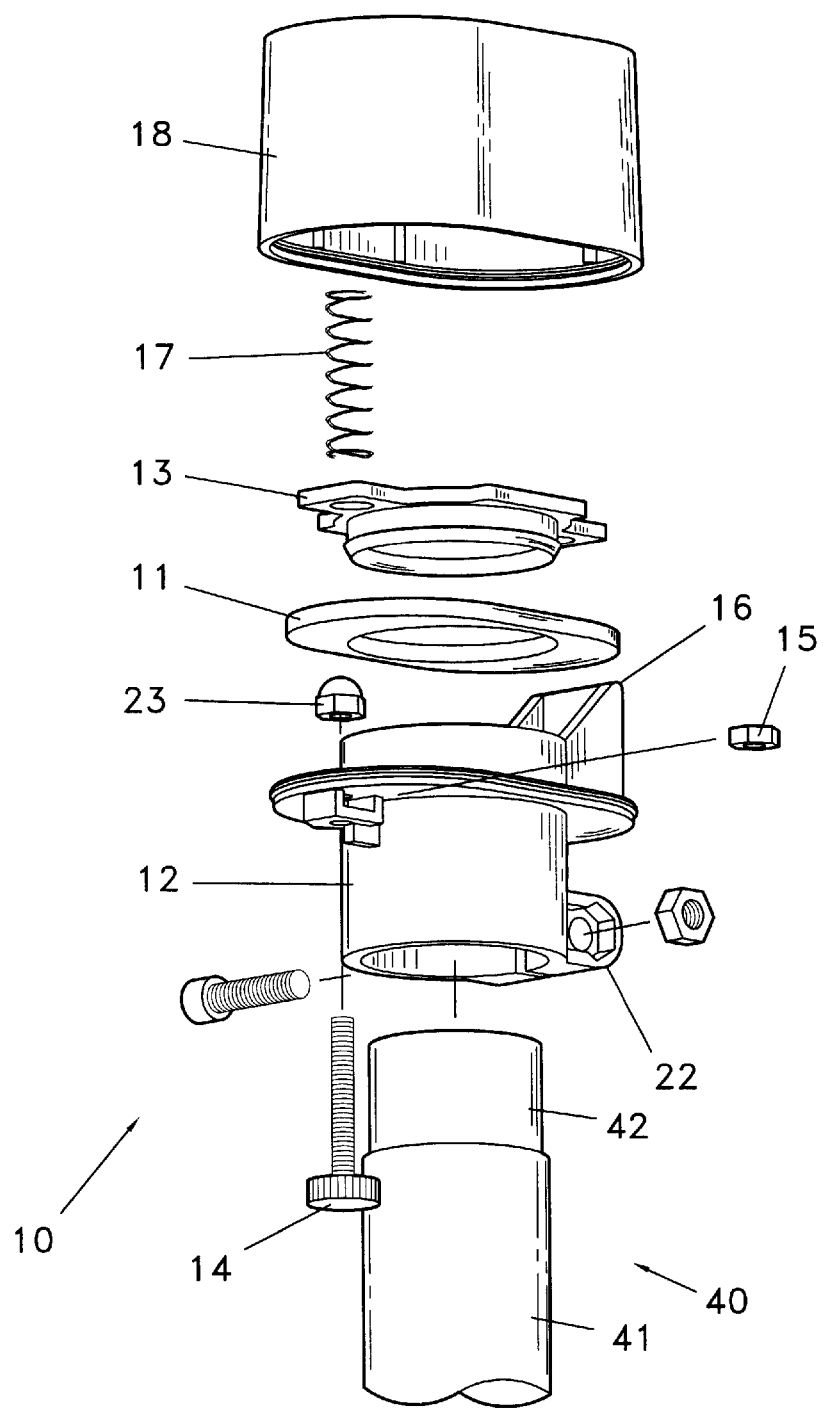
FIG. 17 is an exploded view of a similar embodiment as that shown in FIG. 1.

To eliminate extraneous interference with the operation of device (10) the components are concealed by housing (18), as shown in FIG. 17. Housing (18) is slipped over inner tube (42) and brought down to cover locking plate (11), and the other internal components. Housing (18) also serves as the support surface which allows spring (17) to bias locking plate (11). For this reason the interior height of housing (18) should be limited so as not to require too large a spring. By making housing (18) only slightly taller than the elevated position of high end (A) of locking plate (11) material costs may be minimized as well. The present embodiment is designed such that housing (18) snap-fits onto base (12), as shown in FIG. 14. Several designs for this snap-fit are possible, as is well known by those skilled in the art. Housing (18) may also be designed such that it is attached by other conventional means, such as, but not limited to nuts and bolts, machine screws, adhesives, clamps, or the like. The scope of this aspect of the present invention is intended to cover such minor modifications. It has been anticipated that the exterior of housing (18) may provide adequate surface area for attachment of trademarks, operating instructions, and/or safety labels as well.

The preceding discussion characterizes a single embodiment of this aspect of the present invention. Many of the disclosed elements have suitable replacement components known by those skilled in the relevant field, and are too numerous to practically enumerate. Where suitable replacements are known it is intended that these components be included within the scope and spirit of the patent granted on this aspect of the present invention.

In order to further understand this aspect of the present invention it is desirable to discuss device (10) as it functions in operation. Referring to FIG. 14, the process for raising a high load secured to the free end of inner tube (42) can be understood. By "high load" it is meant that the present embodiment is designed to elevate objects greater in weight than that which the operator could normally lift with a single hand. However, the embodiment, and particularly radius (25), could naturally be scaled down to function adequately for "light load" objects as well.

The safest way to extend inner pole (42) is to first insure locking plate (11) is sufficiently inclined to cause frictional engagement of insert (13) with inner tube (42). This may be accomplished by lowering thumbscrew (14) so that it is completely disengaged from plate (11). Then inner tube (42) may be raised in any conventional manner. Upon release of inner tube (42) the applied load will cause insert (13), which at this point is fully engaged with inner tube (42), to force locking plate (11) into a locked position.

Referring to FIG. 16, a cross section of insert (13), it can be seen that the inner edge (24) of insert (13) is partially radiused. A full radiused inner edge has proven to be undesirable because of its difficulty in release. However, it is anticipated that, while not tested, multiple radiuses may work with varying degrees of success. Insert (13), of this embodiment, is made of $MoS_2$ filled polyamide material. This material is believed to provide increased friction and wear resistance over a standard polyamide, such as nylon 6/6. It may also supply a smoother and more controllable performance by decreasing the differential between the static and dynamic coefficients of friction. Naturally, it is within the scope of this discussion to use other materials known to those skilled in the art which may have relatively close static and dynamic coefficients of friction. The closeness of these parameters is dependent on the materials ability to be adjusted to numerous degrees of frictional engagement between a completely locked position and a disengaged position.

After raising the load it will naturally be desirable at some point to lower the load. With this aspect of the present invention this process is greatly facilitated, and with a greater degree of safety. To bring the load downward the operator begins to actuate the means for varying the frictional engagement of insert (13). In the preferred embodiment, thumbscrew (14) is such means, but obviously this means could be provided by a conventional screw, or some other adjustable member. The threaded shaft of thumbscrew (14) gives it an infinitely adjustable range. By turning thumbscrew (14) appropriately, cap nut (23) engages locking plate (11) which is currently in a locked position. Slow turning further biases locking plate (11) toward a horizontal position. As this occurs the frictional engagement of insert (13) with inner tube (42) is decreased. At the point where the magnitude of frictional force is less than the load force inner tube (42) will begin to compress within outer tube (41). As the difference in frictional force and load force is increased the compression rate of inner tube (42) into outer tube (41) is also increased. At any point during descent the operator may back-off thumbscrew (14) to completely engage insert (13) with inner tube (42). After complete descent thumbscrew (14) should be completely disengaged to allow locking plate (11) to settle back into a locked position. Importantly, the entire process may be accomplished with a single hand.

As can be seen in FIG. 5, this aspect of the present invention provides a great deal more control than that of any of the prior art devices. FIG. 5 illustrates the dramatic differences of performance between prior art devices and this aspect of the present invention. The solid line represents how minor interactions by the operator, as he turns thumbscrew (14) to engage locking plate (11), can begin a slow, and continuous compression rate of inner pole (42). Further interaction, through continued turning of thumbscrew (14) causes an increased compression rate, until finally locking plate (11) is fully disengaged or "free". On the other hand, while no element is present in the prior art which is completely analogous to thumbscrew (14), interaction by the operator to bring the locking mechanism in a horizontal position typically begins and ends with a fast, uncontrolled descent of the load. This operation is illustrated by the broken line of FIG. 5.

For increased safety, the operator may wish to begin the load descent and then walk a safe distance from device (10). This may also be helpful in the case where there are a number of poles to descend, for instance at a live public concert with many speakers positioned around a stadium or hall. A single operator could begin the descent of each speaker without having to wait for its completion, saving on valuable man-hours and cost.

Another practice might be to set the compression rate to a slow descent, and then manually pull the load downward. Upon release after each pull the descent returns to its set compression rate. This allows the load to be brought down quicker, by a single person, safely and under complete control.

Spring (17) serves an important function in the descent mode. With many prior art devices, slippage of the cramp mechanism can occur. When this happens, of course, there is a rapid, often catastrophic descent of the inner tube. In addition, rather than the cramp locking again as it is designed to do, there can be a bounce between an engaged and disengaged position causing the inner tube to bounce downward in a choppy and erratic fashion. In this aspect of the present invention, spring (17) prevents the bounce or chatter effect. If there is a frictional disengagement between insert (13) and inner tube (42) the descent is still smooth, continuous and typically very slow. Furthermore, after telescoping pole (40) has been relieved of its load, and is to be carried to a truck or area of storage, it may be held in a downwardly slanted or completely inverted position without fear that inner tube (42) will fall out. This is possible because spring (17) maintains locking plate (11) in a locked position, even upside down. Of course, it is important that after complete descent thumbscrew (14) be disengaged from locking plate (11).

Referring again to FIG. 15, it can be seen that locking plate (11) is designed to be axially symmetric about line a—a. As such, each side then is a mirror image of the other. This allows locking plate (11) to be removed and turned 180° and reinserted when one side of insert (13) becomes too worn. The seat (26) for spring (17) can be seen on both ends of locking plate (11), as the position of spring (17) must also be changed to the opposite end when locking plate (11) is turned. This reversible feature allows the usable life of the insert to be essentially doubled. Alternative designs might allow for a round locking plate to permit even greater increases of usable life. In such a design the locking plate might only be rotated 10° each time, thereby utilizing the full circumference of the inner edge of the insert.

As mentioned earlier, one of the practical elements of device (10) is that it is designed as separate components, which can be removed individually or as an entire unit. This feature allows for the realization of maximum cost effectiveness in manufacturing, and ease of assembly. The materials used for many of the components, such as base (11), and housing (18), in the preferred embodiment are of an impact resistant, dimensionally stable plastic. This material provides an adequate safety factor, as well as being cost effective. In spite of this, it is certainly possible for some of these components to become damaged during normal use or storage. In such an instance the damaged component may be easily replaced without discarding the entire device. This is also the case with the metal components as well. Naturally, should either device (10), or telescoping pole (40) be completely destroyed, each may be replaced without much trouble, or waste of good materials.

While the designs and concepts disclosed focus upon and may find use for raising and lowering of heavy loads atop telescoping poles, it may also obviously find use in a wide variety of other applications. It, therefore should be understood that while the field of application of this aspect of the invention is discussed in the limited contempt, the scope of protection afforded is not intended to be so limited.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims.

It should be understood that a variety of changes may be made without departing from the essence of the invention. Such changes are, also implicitly included in the description. They still fall within the scope of this invention. A broad disclosure encompassing both the explicit embodiment(s) shown, the great variety of implicit alternative embodiments, and the broad methods or processes and the like are encompassed by this disclosure. In addition, each of the various elements of the invention and claims may also be achieved in a variety of manners and by various combinations. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all action may be expressed as a means for talking that action or as an element which causes that action. Similarly, each physical element disclosed should be understood to encompass a disclosure of the action which that physical element facilitates. Regarding this last aspect, the disclosure of a "support" should be understood to encompass disclosure of the act of "supporting"—whether explicitly discussed or not—and, conversely, were there only disclosure of the act of "supporting," such a disclosure should be understood to encompass disclosure of a "support." Such changes and alternative terms are to be understood to be explicitly included in the description.

We claim:

1. A high strength collapsible engineered support, comprising:
   a. vertical support;
   b. at least three legs;
   c. at least one collapse element, wherein said collapse element connects said legs to said vertical support, comprising:
      i. at least three pivot elements;
      ii. at least three separate axial retainers each of which maintains one of said pivot elements responsive to said vertical support;
         a shear load absorber coupled to each of said pivot elements, wherein each said shear load absorber comprises a first concentric member and a second concentric member rotatably engaged, whereby force from said first concentric member is distributed to said second concentric member.

2. A high strength collapsible engineered support as described in claim 1 wherein each of said separate axial retainers which maintains each of said pivot elements responsive to said vertical support and said shear load absorber comprise distinct elements.

3. A high strength collapsible engineered support as described in claim 2 wherein said shear load absorber further comprises a third concentric member and a fourth concentric member rotatably engaged, whereby force from said third concentric member is distributed to said fourth concentric member.

4. A high strength collapsible engineered support as described in claim 2 wherein said at least three pivot elements which pivot with respect to said vertical support are non-metallic pivot elements.

5. A high strength collapsible engineered support as described in claim 4 wherein said non-metallic pivot elements each have a non-metallic pivot element exterior, and wherein said collapse element further comprises at least three flush mounts, each having a flush mount exterior, and wherein said flush mount exterior is flush with said non-metallic pivot elements to diminish interference with other objects.

6. A high strength collapsible engineered support as described in claim 5 wherein said non-metallic pivot elements have a recess for said separate axial retainer to lay flush with the exterior of said non-metallic pivot elements.

7. A high strength collapsible engineered support as described in claim 6 wherein said vertical support has an exterior surface, and wherein said collapse element further comprises a slide element which slidingly engages said exterior surface of said vertical support and further comprising a metal compression element which circumferentially engages said slid element which slidingly engages said exterior of said vertical support to fix a position of said slide element on said exterior surface of said vertical support.

8. A high strength collapsible engineered support as described in claim 7 wherein said metal compression element which circumferentially engages said slide element which slidingly engages said exterior surface of said vertical support to fix a position of said slide element on said exterior surface of said vertical support further comprises a cam arm which flushly fits adjacent to said slide element.

9. A high strength collapsible engineered support as described in claim 2 or 8 wherein said vertical support has a base, and wherein said collapse element further comprises:
   a. at least three brace elements each having a first end and a second end, wherein each of said three brace elements is pivotally responsive to a unitary brace attachment fixed to said base of said vertical support and to one of said at least three legs.

10. A high strength collapsible engineered support as described in claim 9 wherein each of said at least three brace elements further comprises a brace element end cap fixed on each of said first end and said second end.

11. A high strength collapsible engineered support as described in claim 10 wherein said brace element end cap fixed on each of said first end and said second end of said brace element comprise a non-metallic material.

12. A high strength collapsible engineered support as described in claim 10 wherein each of said at least three brace elements further comprise two concave parallel surfaces.

13. A high strength collapsible engineered support as described in claim 12 wherein each of said at least three brace elements further comprise a saddle element having a concave face engaging a corresponding one each of said at least three legs and a planer face responsive to a corresponding one each of said second end of said at least three brace elements.

14. A high strength collapsible engineered support as described in claim 1 wherein said vertical support further comprises an interior surface, and wherein said unitary brace attachment further comprises:
   a. a first concentric interference surface engaged with said exterior surface of said vertical support; and
   b. a second concentric interference surface engaged with said interior surface of said vertical support, wherein said first interference surface and said second interference surface distribute force from said unitary brace attachment to said base of said vertical support.

15. A high strength collapsible engineered support as described in claim 14 wherein said unitary brace responsive to said base of said vertical support comprises a non-metallic material.

16. A high strength collapsible engineered support as described in claim 15 wherein said unitary brace responsive to the base of said vertical support further comprises a cushion element.

17. A high strength collapsible engineered support as described in claim 1, wherein each of said at least three legs has an exterior surface and an interior surface and further comprising at least three dual interference surface leg caps one each responsive to a corresponding leg, and wherein each of said dual interference surface leg caps comprise:
   a. a first interference surface engaged to said exterior surface; and
   b. a second interference surface engaged to said interior surface, wherein said first interference surface and said second interference surface distribute force said leg.

18. A high strength collapsible engineered support as described in claim 17 wherein said leg cap has an depression element which further enhances distribution of said force to said leg.

19. A high strength collapsible engineered support as described in claim 1, wherein said vertical support further comprises a support adaptor with an exterior surface which slidingly engages with an interior surface of said vertical support.

20. A high strength collapsible engineered support as described in claim 19 wherein said support adaptor which slidely engages with said interior surface of said vertical support further comprises a position selector element to fix said support adaptor.

21. A high strength collapsible engineered support as described in claim 20 wherein said selectable fixed position element comprises a catch element which simultaneously engages at least one hole each in said support adaptor and said vertical support to fix the position of said support adaptor which slidely engages with said interior surface of said vertical support.

22. A high strength collapsible engineered support, comprising
   a. a vertical support having a base, wherein said vertical support has an interior surface and an exterior surface;
   b. at least three legs; and
   c. at least three pivot elements which pivot with respect to said vertical support and that connect said legs to said vertical support;
   d. a unitary brace attachment fixed to said base of said vertical support, wherein said
   e. at least three brace elements having a first end and a second end, wherein each brace element has a first end pivotally responsive to said unitary brace attachment, and wherein each brace element has a second end pivotally responsive to a corresponding one each of said at least three legs.

23. A high strength collapsible engineered support as described in claim 22 wherein each of said at least three brace elements further comprises a brace element end cap fixed on said first end and said second end of each of said at least three brace elements.

24. A high strength collapsible engineered support as described in claim 23 wherein said brace element end cap comprises a non-metallic material.

25. A high strength collapsible engineered support as described in claim 24 wherein said at least three brace elements further comprise two concave parallel surfaces.

26. A high strength collapsible engineered support as described in claim 22 wherein said vertical support further comprises an interior surface, and wherein said unitary brace attachment further comprises:
   a. a first concentric interference engaged with said exterior surface of said vertical support; and
   b. a second concentric interference surface engaged with said interior surface of said vertical support, wherein said first interference surface and said second interference surface distribute force from said unitary brace attachment to said base of said vertical.

27. A high strength collapsible engineered support as described in claim 26 wherein said unitary brace responsive to the base of said vertical support comprises a non-metallic material.

28. A high strength collapsible engineered support as described in claim 27 wherein said unitary brace responsive to the base of said vertical support further comprises a cushion element.

29. A high strength collapsible engineered support as described in claim 22, wherein said at least three brace elements further comprise a saddle element having a concave face engaging a corresponding one each of said at least three legs and a planer face responsive to a corresponding one said second end of said at least three brace elements.

30. A high strength collapsible engineered support as described in claim 22 wherein said separate unitary brace attachment comprises at least one vent element.

31. A method of collapsibly supporting an item, comprising the steps of:
   a. pivotally retaining at least three legs with respect to a vertical support at a pivot retention location;
   b. simultaneously pivoting said at least three legs with respect to said vertical support;
   c. establishing said at least three legs in an open position;
   d. locking said at least three legs in said open position;
   e. applying a load to said at least three legs;
   f. resisting said load at a shear load absorber location that is separate from said pivot retention location, wherein said shear load absorber comprises a first concentric member and a second concentric member rotatably engaged, whereby force from said first concentric member is distributed to said second concentric member; and
   g. stabilizing said vertical support through use of said at least three legs; and
   h. supporting said item.

32. A method of collapsibly supporting an item as described in claim 31 wherein said shear force absorber is non-metallic.

33. A method of collapsibly supporting an item as described in claim 31 wherein said step of simultaneously pivoting said at least three legs with respect to said vertical support comprises the steps of:
   a. utilizing a collapse element which slidingly engages said vertical support;
   b. utilizing at least three pivot elements; and
   c. moving said collapse element along said vertical support.

34. A method of collapsibly supporting an item as described in claim 33 wherein said step of moving said collapse element along said vertical support comprises the step of sliding said collapse element along said vertical support, and wherein said step of locking said at least three legs in said open position comprises the step of compressing said collapse element against said vertical support.

35. A method of collapsibly supporting an item as described in claim 34 wherein said step of compressing said collapse element against said vertical support comprises the steps of:
   a. camming said collapse element through operation of a cam arm; and
   b. flushly fitting said cam arm adjacent said collapse element.

36. A method of collapsibly supporting an item as described in claim 31 wherein said vertical support has a base, an interior surface, and an exterior surface, and wherein said step of pivotally retaining at least three legs with respect to a vertical support further comprises the steps of:
   a. establishing a unitary brace attachment responsive to the base of said vertical support;
   b. supporting said interior surface of said vertical support by said unitary brace attachment;
   c. supporting said exterior surface of said vertical support by said unitary brace attachment; and
   d. bracing each of said legs responsive to said unitary brace attachment.

37. A method of collapsibly supporting an item as described in claim 36 wherein said step of establishing a unitary brace attachment responsive to the base of said vertical support comprises the step of utilizing a molded non-metallic unitary brace attachment.

38. A method of collapsibly supporting an item as described in claim 37 and further comprising the steps of:
   a. telescoping an inner portion of said vertical support toward a bottom telescoping end; and
   b. cushioning said inner portion of said vertical support at said bottom telescoping end.

39. A method of collapsibly supporting an item as described in claim 31, 34 or 36 wherein each of said at least three legs have a bottom end, a top end, an interior surface, and an exterior surface, and further comprising the steps of:
   a. capping each of said top ends with a dual interference leg cap;
   b. supporting said interior of each of said legs at said top end by said dual interference leg cap; and
   c. supporting said exterior of each of said legs at said bottom end by said dual interference leg cap.

40. A method of collapsibly supporting an item as described in claim 39 and an exterior, and further comprising the steps of:
   a. capping each of said bottom ends with a dual interference leg cap;
   b. supporting said interior surface of each of said legs at said bottom end by said dual interference leg cap; and
   c. supporting said exterior surface of each of said legs at said bottom end by said dual interference leg cap.

41. A method of collapsibly supporting an item as described in claim 31 or 36 wherein each of said at least three legs have a bottom end, a top end, an interior surface, and an exterior surface, and further comprising the steps of:
   a. capping each of said bottom ends with a dual interference leg cap;
   b. supporting said interior surface of each of said legs at said bottom end by said dual interference leg cap; and
   c. supporting said exterior surface of each of said legs at said bottom end by said dual interference leg cap.

42. A method of collapsibly supporting an item as described in claim 31 or 34 wherein said vertical support has a top, and further comprising the step of adapting said top of said vertical support to fit multiple size attachments.

43. A method of collapsibly supporting an item, comprising the steps of:
   a. retaining at least three legs with respect to a vertical support having an interior surface and an exterior surface;
   b. attaching at least three brace elements by a separate unitary brace attachment fixed to a base of said vertical support, wherein said unitary brace attachment further comprises a first concentric interference surface engaging said interior surface and a second concentric interference surface engaging said exterior surface, whereby force is distributed from said unitary brace attachment to said vertical support;
   c. pivoting said at least three legs and said at least three brace elements with respect to said vertical support;
   d. establishing said at least three legs in an open position;
   e. locking said at least three legs in said open position;
   f. stabilizing said vertical support through use of said at least three legs; and
   g. supporting said item.

44. A method of collapsibly supporting an item as described in claim 43 wherein said step of attaching at least three brace elements by a separate unitary brace attachment at said base of said vertical support comprises the step of utilizing a molded non-metallic unitary brace attachment.

45. A method of collapsibly supporting an item as described in claim 44 and further comprising the steps of:
   a. telescoping an inner portion of said vertical support toward a bottom telescoping end; and
   b. cushioning said inner portion of said vertical support at said bottom telescoping end.

46. A method of collapsibly supporting an item as described in claim 43 wherein said vertical support has a base, an interior, and an exterior, and wherein said step of attaching at least three brace elements by a separate unitary brace attachment at said base of said vertical support comprises the step of venting said interior of said vertical support through action of said separate unitary brace attachment.

* * * * *